US011587373B2

(12) United States Patent
Abari et al.

(10) Patent No.: US 11,587,373 B2
(45) Date of Patent: *Feb. 21, 2023

(54) FLEET MAINTENANCE MANAGEMENT FOR AUTONOMOUS VEHICLES

(71) Applicant: Lyft, Inc., San Francisco, CA (US)

(72) Inventors: Farzad Cyrus Foroughi Abari, San Bruno, CA (US); Aaron Jacob Levine Friedman, San Francisco, CA (US); John Houston, Los Altos, CA (US); Adam Hart Reis, San Francisco, CA (US); Alexander Thomas Starns, Menlo Park, CA (US)

(73) Assignee: Lyft, Inc., San Francisco, CA (US)

( * ) Notice: Subject to any disclaimer, the term of this patent is extended or adjusted under 35 U.S.C. 154(b) by 290 days.

This patent is subject to a terminal disclaimer.

(21) Appl. No.: 16/938,705

(22) Filed: Jul. 24, 2020

(65) Prior Publication Data

US 2021/0012592 A1 Jan. 14, 2021

Related U.S. Application Data

(63) Continuation of application No. 15/853,224, filed on Dec. 22, 2017, now Pat. No. 10,726,644.

(51) Int. Cl.
*G01C 22/00* (2006.01)
*G05D 1/00* (2006.01)
(Continued)

(52) U.S. Cl.
CPC ......... *G07C 5/0808* (2013.01); *G05D 1/0088* (2013.01); *G05D 1/0291* (2013.01);
(Continued)

(58) Field of Classification Search
CPC .... G07C 5/0808; G07C 5/006; G05D 1/0088; G05D 1/0291; G06N 5/04; G06N 20/00;
(Continued)

(56) References Cited

U.S. PATENT DOCUMENTS

2014/0358353 A1* 12/2014 Ibanez-Guzman ........................ B60W 60/0025 701/23
2017/0278312 A1* 9/2017 Minster ................ G05D 1/0297
(Continued)

*Primary Examiner* — Harry Y Oh
(74) *Attorney, Agent, or Firm* — Baker Botts L.L.P.

(57) ABSTRACT

In particular embodiments, a computing system may determine a predicted amount of ride requests for a plurality of collectively-managed vehicles and determine an availability of the collectively-managed vehicles to satisfy the predicted amount of ride requests. Subsequent to determining that the availability fails to satisfy one or more predetermined criteria for servicing the predicted amount of ride requests, the system may determine status information associated with the collectively-managed vehicles and determine, based on at least the status information, one or more minimum services for servicing one or more vehicles among the plurality of collectively-managed vehicles at one or more service centers such that the availability satisfies the one or more predetermined criteria. The system may instruct the one or more vehicles that are to receive the one or more minimum services to travel to the one or more service centers to be serviced.

20 Claims, 8 Drawing Sheets

(51) Int. Cl.
*G07C 5/08* (2006.01)
*G06N 5/04* (2023.01)
*G07C 5/00* (2006.01)
*G05D 1/02* (2020.01)
*G06N 20/00* (2019.01)
*G06Q 50/30* (2012.01)
*G06Q 10/20* (2023.01)
*G06Q 10/063* (2023.01)
*G06Q 10/02* (2012.01)

(52) U.S. Cl.
CPC .............. *G06N 5/04* (2013.01); *G06N 20/00* (2019.01); *G06Q 10/02* (2013.01); *G06Q 10/063* (2013.01); *G06Q 10/20* (2013.01); *G06Q 50/30* (2013.01); *G07C 5/006* (2013.01)

(58) Field of Classification Search
CPC ...... G06Q 10/02; G06Q 10/063; G06Q 10/20; G06Q 50/30
See application file for complete search history.

(56) References Cited

U.S. PATENT DOCUMENTS

| | | | |
|---|---|---|---|
| 2018/0178741 A1* | 6/2018 | Poeppel | B60W 30/00 |
| 2018/0201148 A1* | 7/2018 | Donnelly | B60L 53/64 |
| 2018/0211185 A1* | 7/2018 | Rakah | G08G 1/0129 |

* cited by examiner

FLEET MAINTENANCE MANAGEMENT FOR AUTONOMOUS VEHICLES

PRIORITY

This application is a continuation under 35 U.S.C. § 120 of U.S. patent application Ser. No. 15/853,224 filed 22 Dec. 2017, now issued as U.S. Pat. No. 10,726,644, which is incorporated herein by reference.

BACKGROUND

A transportation management system, in response to ride requests, may match the needs of ride requestors with ride providers who are willing to use their vehicles to provide the requested transportation or services. For instance, through a transportation application installed on a mobile device, a ride requestor may submit a request for a ride from a starting location to a destination location at a particular time. In response to the request, the transportation management system may match the ride requestor's needs with any number of available ride providers and notify the matching ride providers of the ride request. The ride providers, through a corresponding transportation application installed on their respective mobile devices, may see the request notification and accept or reject the ride request. Once a ride provider accepts the request, the transportation management system may, in response, facilitate the ride transaction between the matched ride requestor and ride provider. A transportation management system may also fulfill ride requests by dispatching autonomous vehicles. For instance, in response to a ride request, a transportation management system may dispatch and instruct an autonomous vehicle in a fleet of autonomous vehicles managed by the system (or by a third party system in communication with the transportation management system) to transport the requestor. An autonomous vehicle may be a vehicle that is capable of sensing its environment and navigating with little to no human input. The autonomous vehicle may be equipped with a variety of systems or modules for enabling it to determine its surroundings and safely navigate to target destinations.

In conventional transportation management systems, human drivers typically manage maintenance and cleaning of the vehicles they drive. With technological progress in autonomous vehicles, transportation services may dispatch autonomous vehicles to fulfill transportation requests. In contrast to human-driven vehicles, autonomous vehicles do not have corresponding human drivers who would maintain or service the vehicles as they operate the vehicles. As such, a transportation system using autonomous vehicles may manage more than matching and dispatching autonomous vehicles to fulfill transportation requests from transportation requestors.

DESCRIPTION OF EXAMPLE EMBODIMENTS

Figure 1:
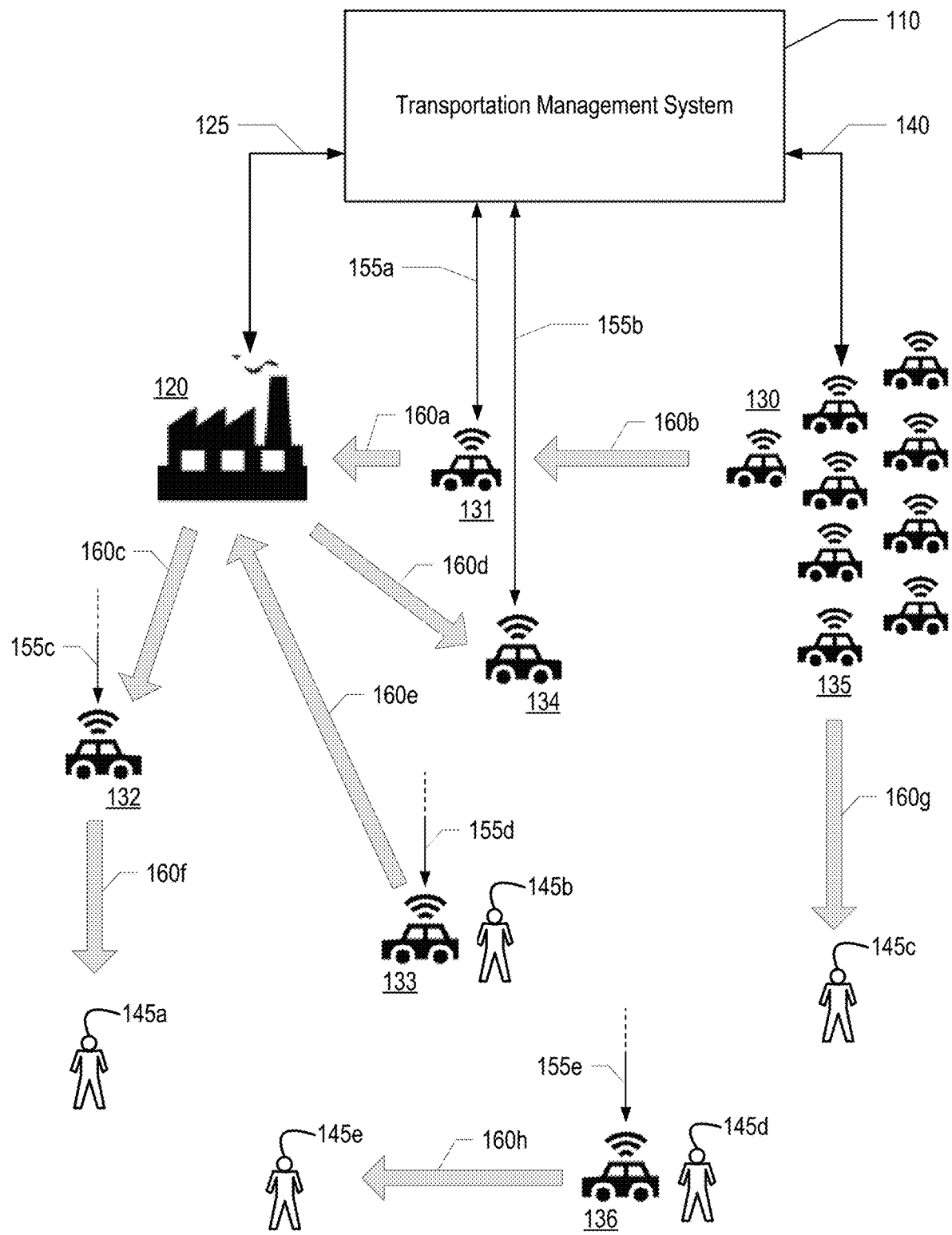
FIG. 1 illustrates an example of a fleet maintenance management environment, according to one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

A transportation management system may, on behalf of one or more ridesharing services or other types of transportation services, dispatch and instruct an autonomous vehicle in one or more different fleets of autonomous vehicles to transport a ride requestor in response to receiving a ride request. An autonomous vehicle may be a vehicle that is capable of sensing its environment and navigating with little to no human input. The autonomous vehicle may be equipped with a variety of systems or modules for enabling it to determine its surroundings and safely navigate to target destinations. For example, an autonomous vehicle may have an integrated computing system (e.g., one or more central processing units, graphical processing units, memory, and storage) for controlling various operations of the vehicle, such as driving and navigating. To that end, the computing system may process data from one or more sensor arrays. For example, an autonomous vehicle may have optical cameras for, e.g., recognizing roads and lane markings; infrared cameras for, e.g., night vision; LiDARs for, e.g., detecting 360° surroundings; RADAR for, e.g., detecting distant hazards; stereo vision for, e.g., spotting hazards such as pedestrians or tree branches; wheel sensors for, e.g., measuring velocity; ultra sound for, e.g., parking and obstacle detection; global positioning system (GPS) for, e.g., determining the vehicle's current geolocation; and/or inertial measurement units, accelerometers, gyroscopes, and/or odometer systems for movement or motion detection. Data from these systems and modules may be used by a navigation system to safely guide the autonomous vehicle, even without the aid of a human driver. The autonomous vehicle may also include communication devices for, e.g., wirelessly communicating with one or more servers, user devices (e.g., smartphones, tablet computers, smart wearable devices, laptop computers) and/or other vehicles.

Operating a successful transportation service using a fleet of autonomous vehicles involves more than matching and dispatching the autonomous vehicles to fulfill ride requests from ride requestors. Beyond the hardware and software for matching rides, substantial technology is needed for fleet management. For example, in a ridesharing service in which ride providers (human drivers) drive their own vehicles, the ride providers are responsible for maintaining their own vehicles. However, a transportation service that uses a fleet of autonomous vehicles to fulfill ride requests is responsible for ensuring that, even without the benefit of frequent and regular human observation or inspection, the autonomous vehicles in the fleet are kept in good working order and that they meet all applicable safety and regulatory requirements. In addition, the transportation service may be responsible for meeting quality of service goals regarding the availability of autonomous vehicles to fulfill ride requests. The fact that all autonomous vehicles in the fleet must, from time to time, be taken out of a pool of vehicles available to fulfill ride requests in order to be serviced, such as by charging the battery, fueling the vehicle, cleaning the vehicle, repairing the vehicle or performing other types of maintenance tasks, causes the available supply of autonomous vehicles to fluctuate over time (e.g., within a single day and/or on different days). At the same time, demand for autonomous vehicles to fulfill ride requests can vary widely within a single day and/or on different days (e.g., with higher demand during rush hours and lower demand after midnight or on weekend mornings). The need to balance vehicle maintenance requirements with quality of service goals makes meeting demand for ride services more difficult, especially when demand is high, and makes processes for matching available autonomous vehicles to riders while demand fluctuates more complicated. The transportation management systems described herein may take advantage of demand patterns and observations of other events that affect supply and demand, scheduling autonomous vehicles for service during predicted periods of low demand. In certain embodiments, a fleet of autonomous vehicles may be used to provide delivery services (e.g., for delivering meals or any of a variety of goods) instead of, or in addition to, providing transportation services. The transportation management systems described herein may take advantage of demand patterns for these delivery services and observations of other events that affect supply and demand for delivery services when scheduling autonomous vehicles for service.

Particular embodiments described herein relate to generating, by a transportation management system, a prediction of demand for autonomous vehicles in a fleet of autonomous vehicles based on, among other factors, data representing current conditions and future events, and scheduling an autonomous vehicle for service based on the prediction. The transportation management system may send instructions to the autonomous vehicle causing it to drive to a service center where the scheduled services are to be performed. The data representing current conditions may include data received from sensors located within autonomous vehicles in the fleet or notifications of current events that are likely to affect demand for autonomous vehicles. The prediction of demand for autonomous vehicles may also be based on historic supply and demand data derived from data received from autonomous vehicles in the fleet and/or data received from a transportation application running on various requestor computing devices, data representing characteristics of vehicles in the fleet, location data received from vehicles in the fleet and/or other factors.

A transportation management system may manage the available fleet size and tune service times and/or service intervals based on predicted demand. This may include determining, based on predicted demand, when particular autonomous vehicles are in need of service, determining the order in which autonomous vehicles are to be serviced and/or the order in which services are to be performed on a particular autonomous vehicle, and/or determining how autonomous vehicles should be prepositioned subsequent to being serviced. A transportation management system may schedule autonomous vehicles for service during periods of predicted low demand and/or based on the urgency of performing various needed services. In particular embodiments, a subset of needed services may be performed during a short window of predicted low demand or during a period of high or peak demand if, for example, a vehicle does not meet minimum maintenance requirements for being included in a pool of vehicles available to fulfill ride requests or delivery requests. When scheduling autonomous vehicles for service, a transportation system may also take into consideration the capabilities, available capacity, speed of operations, and/or locations of various service centers. In particular embodiments, a transportation management system may generate a predictive model for supply and demand for a fleet of autonomous vehicles using machine learning.

Particular embodiments address the inability of autonomous vehicles to manage their own service needs, especially in the context of a fleet of autonomous vehicles for which there is fluctuating demand. For example, by scheduling vehicle maintenance during predicted periods of low demand, a transportation management system may optimize the availability of service-ready autonomous vehicles during peak-demand periods, which allows a transportation or delivery service to meet its quality of service goals while using its resources efficiently. While the transportation management system is described below primarily in terms of managing a fleet of autonomous vehicles on behalf of a service for transporting passengers (e.g., ride requestors), it should be understood that the disclosed system and methods may also be applied to managing a fleet of autonomous vehicles on behalf of a delivery service or another type of service for which there is fluctuating demand for autonomous vehicles.

FIG. 1 illustrates an example of a fleet maintenance management environment 100, in accordance with particular embodiments described herein. Fleet maintenance management environment 100 may include transportation management system 110 and one or more service centers 120 at which autonomous vehicles in a fleet of autonomous vehicles (shown as fleet 130) can be serviced. At any given point in time, fleet 130 may include a pool of autonomous vehicles available to fulfill ride requests and may also include one or more autonomous vehicles that are not available to fulfill ride requests, some of which may be scheduled for and/or receiving services at a service center 120. Transportation management system 110 may include a demand model generation module configured to access historical supply and demand data, as well as information about current and/or future events that may affect demand or supply, and to generate a prediction of demand for autonomous vehicles in fleet 130 based on these inputs. For the purposes of this discussion, the term "supply" refers to the number of autonomous vehicles that are available to fulfill ride requests and the term "demand" refers to the number of ride requests. The phrase "historical supply and demand data" refers to past levels of ridership demand and autonomous vehicle supply that were experienced by the transportation service and/or observed by the transportation management system. In particular embodiments, transportation management system 110 may generate a predictive demand model indicating times at which demand is predicted to be high, times at which demand is predicted to be low, and the predicted duration of these periods of high and low demand. In one example embodiment, a period in which demand is predicted to be less than 50% of observed peak demand may be considered a period of low demand, while a period in which demand is predicted to exceed 80% of the maximum capacity of the fleet may be considered a period of high demand. In other embodiments, there may be different criteria for classifying a predicted demand level as being low or high. In various embodiments, any number of predicted demand levels may be defined and the define demand levels may include one or more intermediate demand levels.

Predictive demand models generated by transportation management system 110 may be used, along with other information, to determine when particular autonomous vehicles should be scheduled for service and to generate corresponding scheduling and/or navigation instructions. For example, in particular embodiments, transportation management system 110 may be configured to receive data transmissions 125 from service center(s) 120 and to receive data transmissions 140 from one or more autonomous vehicles in fleet 130. As an example and not by way of limitation, data transmissions 125 received from service center(s) 120 may include data representing service center status, capabilities, estimated times for performing particular services, and available capacity. As an example and not by way of limitation, data transmissions 140 received from autonomous vehicles in fleet 130 may include vehicle status information, such as mileage or a time interval since the vehicle was last serviced, or data indicating that the vehicle is in need of fuel, a battery charge, an oil change, a car wash, or a repair to fix or replace a broken sensor or address a wear-and-tear condition. In particular embodiments, transportation management system 110 may include a fleet management engine configured to determine which, if any, autonomous vehicles should be scheduled for service during a predicted period of low demand or during a period in which the number of autonomous vehicles available to fulfill ride requests exceeds the predicted level of demand due to an influx of autonomous vehicles in the service area (e.g., a period in which there is a surge in the supply of autonomous vehicles), based on these inputs. The fleet management engine may provide navigation instructions and/or other commands to autonomous vehicles in fleet 130 in accordance with the scheduling and/or navigation instructions. In particular embodiments, scheduling and/or navigation instructions may include prepositioning instructions indicating locations to which autonomous vehicles in fleet 130 should be directed following the completion of any scheduled services. In particular embodiments, scheduling and/or navigation instructions may include prepositioning instructions indicating locations to which autonomous vehicles in fleet 130 should be directed prior to receiving maintenance services, such as locations within proximity of a service center at which vehicles wait for their turn to be serviced. The operations of transportation management system 110, a demand model generation module thereof, and a fleet management engine thereof are described in more detail below.

In the illustrated example, transportation management system 110 has determined, based on various predictive demand models and other inputs, that autonomous vehicle 131 of fleet 130 should be scheduled for one or more services at service center 120. For example, transportation management system 110 may have determined that demand for autonomous vehicles is currently low and is predicted to remain so for the near term. In addition, data received from autonomous vehicle 131 may indicate a need for a particular service and data received from service center 120 may indicate a current capability and capacity for performing the needed service. In response to this determination, transportation management system 110 has provided instructions 155a to autonomous vehicle 131 to drive (or return) to service center 120 for servicing. In accordance with instructions 155a, autonomous vehicle 131 may be removed from the pool of autonomous vehicles available to fulfill ride requests, a condition that may also be referred to as being taken "offline," and may drive to service center 120 for servicing, In FIG. 1, autonomous vehicle 131 is shown en route to service center 120, having followed route 160b to an intermediate location, and is proceeding to service center 120 following route 160a.

In the illustrated example, transportation management system 110 has previously (e.g., during a predicted period of low demand with respect to the available autonomous vehicle resources) scheduled autonomous vehicle 134 of fleet 130 to receive one or more services at service center 120, at which point autonomous vehicle 134 was taken offline. After the scheduled services were completed, transportation management system 110, based on various predictive demand models, determined a location at which autonomous vehicle 134 should be prepositioned prior to returning to the pool of autonomous vehicles available to fulfill ride requests. For example, transportation management system 110 may have determined that demand at or near a particular location within the region in which fleet 130 operates is currently high and/or is predicted to be high in the near term. In response to this determination, transportation management system 110 has provided instructions 155b to autonomous vehicle 134 to drive to the determined prepositioning location following route 160d, at which point autonomous vehicle 134 may be returned to the pool of autonomous vehicles available to fulfill ride requests.

In the illustrated example, transportation management system 110 previously (e.g., during a period of predicted low demand) scheduled autonomous vehicle 132 of fleet 130 to receive one or more services at service center 120, at which point autonomous vehicle 132 was taken offline. After the scheduled services were completed, transportation management system 110 may have returned autonomous vehicle 132 to the pool of autonomous vehicles available to fulfill ride requests based on a predicted increase in demand. In FIG. 1, autonomous vehicle 132 is shown as having driven from service center 120 to an intermediate location following route 160c prior to receiving additional instructions from transportation management system 110. Subsequently, transportation management system 110 determined that autonomous vehicle 132 should be dispatched to fulfill a ride request received from user 145*a* (e.g., a ride requestor). In response to this determination, transportation management system 110 has provided instructions 155*c* to autonomous vehicle 132 to drive to the location of user 145*a* following route 160*f.*

In the illustrated example, transportation management system 110 previously dispatched autonomous vehicle 133 of fleet 130 to fulfill a ride request received from user 145*b*. After transporting user 145*b* to the requested destination, transportation management system 110 determined, based on various predictive demand models, that autonomous vehicle 133 should be scheduled for one or more services at service center 120. For example, transportation management system 110 may have determined that demand is predicted to be low in the near term, and may have received data indicating that autonomous vehicle 133 is in need of servicing and that service center 120 has availability to perform the required service. In response to this determination, transportation management system 110 has provided instructions 155*d* to autonomous vehicle 133 to drive (or return) to service center 120 for servicing following route 160*e*. In the illustrated example, transportation management system 110 determined, based on various predictive demand models, that autonomous vehicle 135 of fleet 130 (which was in the pool of autonomous vehicles available to fulfill ride requests) should be dispatched to fulfill a ride request received from user 145*c* rather than being scheduled for service. For example, transportation management system 110 may have determined that demand for autonomous vehicles is currently high, and is predicted to remain so in the near term, and may postpone any required maintenance for autonomous vehicle 135 until the next predicted period of low demand. In response to this determination, transportation management system 110 has provided instructions to autonomous vehicle 131 (not explicitly shown in FIG. 1) to drive to the location of user 145*c* following route 160*g*.

In the illustrated example, transportation management system 110 previously dispatched autonomous vehicle 136 of fleet 130 to fulfill a ride request received from user 145*d*. After transporting user 145*d* to the requested destination, transportation management system 110 determined, based on various predictive demand models, that autonomous vehicle 145*d* (which, at this point, was in the pool of autonomous vehicles available to fulfill ride requests) should be dispatched to fulfill a ride request received from user 145*e* rather than being scheduled for service. For example, transportation management system 110 may have determined that demand for autonomous vehicles is currently high, and is predicted to remain so in the near term, and/or that autonomous vehicle 136 is not currently in need of servicing. In response to this determination, transportation management system 110 has provided instructions 155*e* to autonomous vehicle 136 to drive to the location of user 145*e* following route 160*h*.

The example embodiment illustrated in FIG. 1 includes a single transportation management system 110 that manages fleet 130 on behalf of a transportation service in a particular service area. In certain embodiments, there may be multiple independent transportation management systems 110 that collectively manage one or more fleets of autonomous vehicles on behalf of a transportation service. For example, each transportation management system instance may operate in a different service area. As illustrated in FIG. 1 and described above, a transportation management system may be configured to schedule particular autonomous vehicles for service, or to refrain from scheduling particular autonomous vehicles for service, based at least on part on a prediction of demand. In embodiments in which there are multiple transportation management systems 110 that collectively manage fleets of autonomous vehicles on behalf of a transportation service, each instance of the transportation management system 110 may be implemented differently and/or may be tuned independently of the others. For example, each instance of the transportation management system 110 may be tuned through machine learning using localized training data or may incorporate market-specific parameters, such as the availability of specific vehicle types or products offered in particular service areas, in its decision-making. In certain embodiments, different transportation management system instances may be tuned based on different metrics of value. For example, a transportation management system 110 operating in New York might be tuned to fulfill ride requests and perform vehicle maintenance at the lowest total operating cost, whereas a transportation management system 110 operating in Houston might be tuned to fulfill ride requests and perform vehicle maintenance in a manner that yields the lowest estimated times of arrival (ETAs) for ride requestors.

Figure 2:
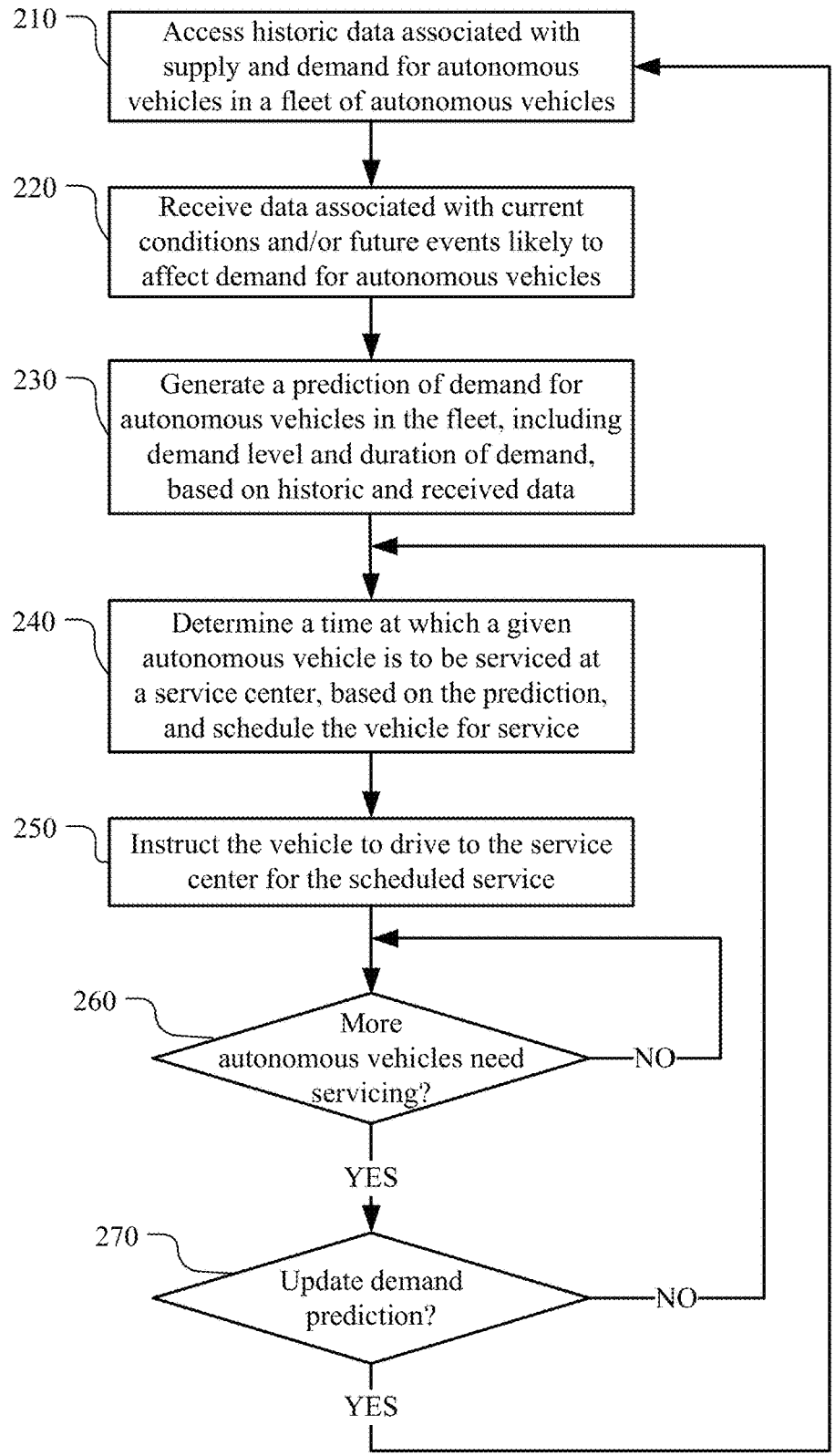
FIG. 2 illustrates an example of a method for generating a demand prediction and using it for scheduling an autonomous vehicle for service.

FIG. 2 illustrates an example method 200 for generating a prediction of demand for autonomous vehicles and scheduling an autonomous vehicle for service based on the prediction, according to particular embodiments described herein. In particular embodiments, method 200 may be implemented by a transportation management system (such as system 110) or by a module or subsystem of a transportation management system. The method may begin at step 210, at which a transportation management system may access historic data associated with supply and demand for autonomous vehicles in a fleet of autonomous vehicles. In particular embodiments, the historic supply and demand data for autonomous vehicles may be specific to the region in which the fleet of autonomous vehicles operates or to particular locations within the region in which the fleet of autonomous vehicles operates, or may be specific to autonomous vehicles with particular characteristics, such as a vehicle type, a vehicle class, or an optional vehicle feature.

At step 220, the transportation management system may receive data associated with current conditions and/or future events that are likely to affect demand for autonomous vehicles in the future. In particular embodiments, a future event about which the transportation management system receives data may be a known upcoming event that is likely to affect demand in the region in which the fleet of autonomous vehicles operates, such as a concert, sporting event, or storm event. In particular embodiments, a future event about which the transportation management system receives data may be an upcoming event that is predicted to take place based on learned patterns of events that affect demand in the region in which the fleet of autonomous vehicles operates. For example, the time and duration of rush hours on certain days may be predicted based on learned patterns of traffic. In particular embodiments, a current condition about which the transportation management system receives data may be the status of an autonomous vehicle or service center, or a condition affecting traffic in the region in which the fleet of autonomous vehicles operates. For example, the transportation management system may receive status information from the autonomous vehicles and/or service centers or may receive notifications about current events (such as traffic accidents, road construction, or weather events) from the autonomous vehicles, from service centers, or from third parties or external services (such as news, weather services, or government information services).

At step 230, the transportation management system may generate a prediction of demand for autonomous vehicles in the fleet, including a predicted demand level and a predicted duration of the predicted demand level, based on historic and received data. Generating the prediction of demand may be further based on respective characteristics of one or more autonomous vehicles in the fleet of autonomous vehicles, or on the capabilities, available capacity, speed of operations, and/or locations of various service centers. In particular embodiments, the generated prediction of demand may include a respective predicted demand level for each of multiple locations within a region in which the fleet of autonomous vehicles operates or for autonomous vehicles having particular characteristics. For example, a generated prediction of demand for a luxury vehicle may be quite different from a generated prediction of demand for a vehicle having built-in child safety seats, and these generated predictions of demand may vary at different locations within the operating region, at different times of day, and/or on different days (e.g., work days, weekend days, or holidays).

At step 240, the transportation management system may identify a given autonomous vehicle in need of service, identify a service center suitable for servicing the given autonomous vehicle, and determine a time at which a given autonomous vehicle is to be serviced at the identified service center, based at least in part on the prediction of demand, after which the system may schedule the vehicle for service. For example, the transportation management system may be configured to determine (e.g., based on a status or other data received from the given autonomous vehicle) that the vehicle is due for periodic maintenance or inspection, that the vehicle battery needs to be charged, that the vehicle needs to be refueled, or that the vehicle is in need of repair.

Identifying a service center that is suitable for servicing the given autonomous vehicle may be based on a particular service to be performed on the given autonomous vehicle, and/or on the capability of various service centers to perform the particular service. The transportation management system may receive respective status information from the service centers including information about their capabilities. Determining the time at which the given autonomous vehicle is to be serviced may be further based on a characteristic of the given autonomous vehicle, the capacity of various service centers to perform the particular service at particular times, an estimated amount of time required to perform the particular service at various service centers, or estimates of the travel time from a current location of the given autonomous vehicle to various service centers. In particular embodiments, determining the time at which the given autonomous vehicle is to be serviced may include determining, based at least on part on the generated prediction of demand, a default interval between service appointments for at least some of the autonomous vehicles in the fleet, including the given autonomous vehicle, and/or determining, based at least on part on the generated prediction of demand, an order in which multiple autonomous vehicles in the fleet of autonomous vehicles are to be serviced.

At step 250, the transportation management system may instruct the given autonomous vehicle to drive to the service center for the scheduled service at the determined service time. For example, the transportation management system may be configured to communicate with the given autonomous vehicle to provide navigation instructions, a location or address associated with the service center, and/or other commands to the vehicle, as described in further detail below.

At step 260, the transportation management system may determine whether any additional autonomous vehicles are in need of servicing. For example, the transportation management system may be configured to determine (e.g., based on data received from one or more other autonomous vehicles in the fleet) whether any other vehicle is due for periodic maintenance or inspection, that its battery needs to be charged, that it needs to be refueled, or that it is in need of repair. If, at step 260, it is determined that one or more other autonomous vehicles are in need of servicing, the transportation management system may proceed to step 270. Otherwise, the transportation management system may return to step 240, after which the system may repeat steps 240 to 260 one or more times, as appropriate, to schedule one or more other autonomous vehicles for servicing.

At step 270, the transportation management system may determine whether the generated prediction of demand should be updated. For example, in particular embodiments, the prediction of demand may be regenerated periodically (e.g., at fixed intervals or on a fixed schedule), in response to received data, or on-demand in response to an explicit request from an administrator or other privileged user of the transportation management system. If, at step 270, it is determined that the demand prediction should be updated, the transportation management system may return to step 210, after which any or all of steps 210 to 250 may be repeated one or more times, as appropriate, to regenerate the prediction of demand and to use the regenerated prediction of demand when scheduling autonomous vehicles for service.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for generating a prediction of demand for autonomous vehicles and scheduling an autonomous vehicle for service based on the prediction including the particular steps of the method of FIG. 2, this disclosure contemplates any suitable method for generating a prediction of demand for autonomous vehicles and scheduling an autonomous vehicle for service based on the prediction including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
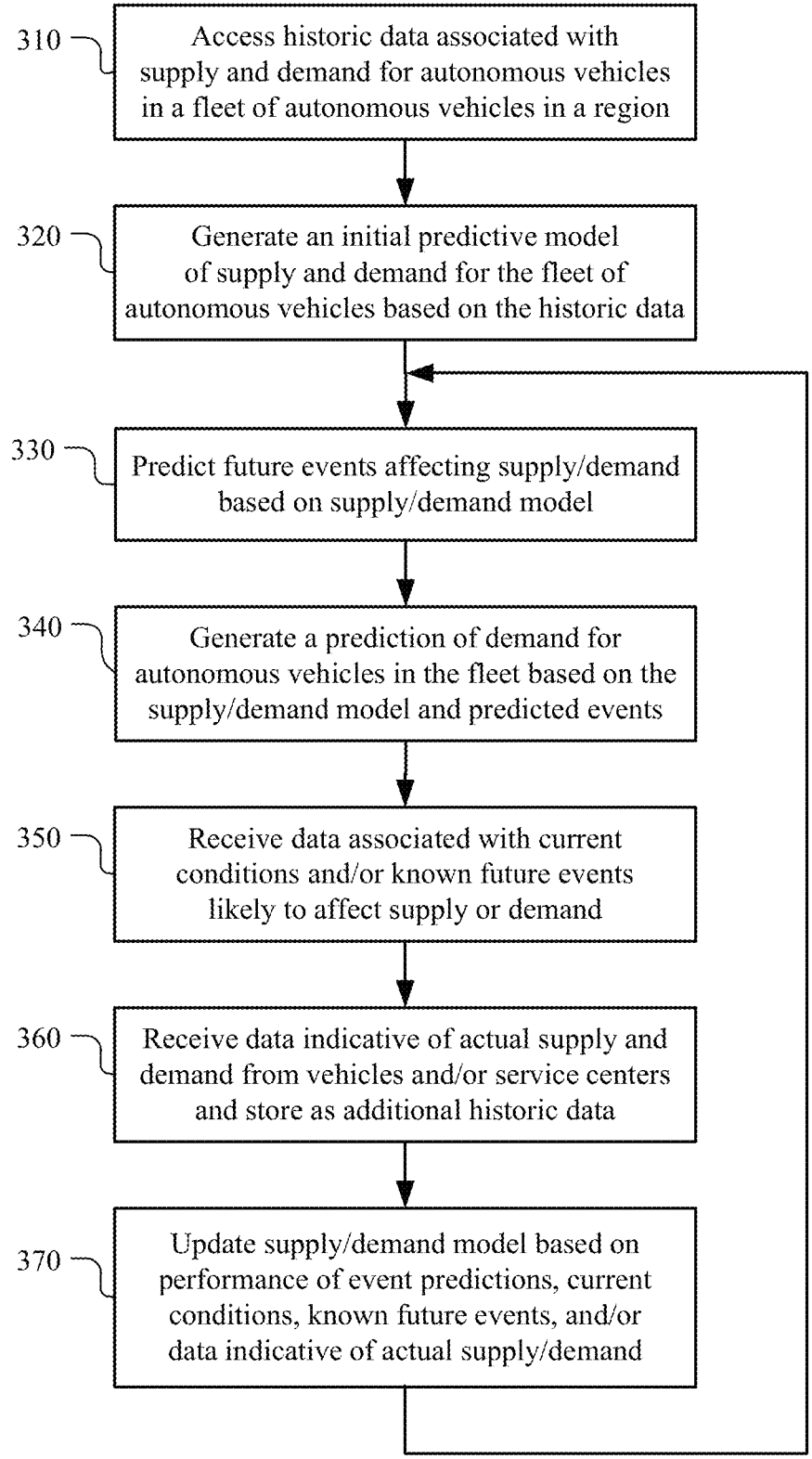
FIG. 3 illustrates an example of a method for generating a prediction of demand for autonomous vehicles based on historic data, current conditions, and future events.

FIG. 3 illustrates an example method 300 for generating a prediction of demand for autonomous vehicles based on historic data, current conditions, and future events, according to particular embodiments described herein. In particular embodiments, method 300 may be implemented by a transportation management system (such as system 110) or by a module or subsystem of a transportation management system. The method may begin at step 310, at which the transportation management system may access historic data associated with supply and demand for autonomous vehicles in a fleet of autonomous vehicles operating in a particular region. In particular embodiments, a transportation application running on the computing devices of ride requestors may capture data from which, in the aggregate, supply and demand data for a fleet of autonomous vehicles may be derived. This data may be provided to and stored by the transportation management system as historic supply and demand data. Instances of the transportation application may capture data that collectively reflect the volume of ride requests and the promptness with which they are serviced during particular weather events, at different locations, on different days, and/or at different times (e.g., during at rush hour), and the transportation management system may leverage this information when determining how to manage maintenance for autonomous vehicles in the fleet. In particular embodiments, instances of a transportation application running on computing devices at various service centers may capture data reflecting when, which, and/or how many autonomous vehicles are received for service and how long they remain unavailable for servicing ride requests. This data may be provided to and stored by the transportation management system as historic supply data. In certain embodiments, the transportation management system may manage one or more fleets of autonomous vehicles that are operated by different vehicle manufacturers or service providers. In such embodiments, the transportation management system may not have control over the number of autonomous vehicles that are available for fulfilling ride requests at any given time, and this may affect the way the supply of autonomous vehicles is predicted by the transportation management system.

At step 320, the transportation management system may generate an initial predictive model of supply and demand for the fleet of autonomous vehicles based on the historic supply and demand data. For example, in particular embodiments, the transportation management system may be configured to identify patterns in the historic supply and demand data and to generate an initial predictive model of supply and demand that reflects the identified patterns.

At step 330, the transportation management system may predict future events that are likely to affect the current and/or future supply and demand based on the predictive model of supply and demand for the fleet. For example, in particular embodiments, the transportation management system may be configured to identify patterns in the occurrence of particular types of events, such as a sporting event that occurs every Friday night at a particular location or a religious service that occurs every Sunday morning at a particular location, both of which have, in the past, resulted in increased demand for autonomous vehicles. Based on these observed patterns, the transportation management system may predict that the sporting event will occur on the next Friday night and that the religious service will occur on the next Sunday morning.

At step 340, the transportation management system may generate a prediction of demand for autonomous vehicles in the fleet based on the initial predictive model of supply and demand and any predicted events. Generating the prediction of demand for the fleet may include generating respective predictions of demand for vehicles with certain characteristics and/or at certain locations within the region in which the fleet of autonomous vehicles operates.

At step 350, the transportation management system may receive data associated with current conditions (such as the status of an autonomous vehicle or service center, traffic accidents, road construction, weather events, or another condition affecting traffic) and/or known future events (such as concerts, sporting events, or storm events) that are likely to affect supply and/or demand. In particular embodiments, some of received data may represent vehicle-specific information that is received from one of the autonomous vehicles in the fleet, such as an indication that a sensor is broken, that the battery state of charge is low, or that the vehicle is low on fuel. In particular embodiments, some of received data may represent information specific to a particular service center, such as an indication of the currently available capacity, current estimates of the amount of time it would take to perform particular services at the service center, or an indication of a change in capabilities of the service center (such as if a piece of equipment required to perform a particular service is broken).

At step 360, the transportation management system may receive, from autonomous vehicles and/or service centers, data indicative of actual supply and demand and may store this data as additional historic supply and demand data. The data may include, for example, data captured by a transportation application running on the computing devices of ride requestors or data provided by a transportation application running on the computing devices of various service centers. In particular embodiments, the actual supply may be affected by the number of autonomous vehicles that are currently receiving services at various service centers (and are therefore not included in the pool of autonomous vehicles available to fulfill demand) and the number of autonomous vehicles that need to be serviced but have not yet been scheduled for service (such as any vehicles that do not meet minimum requirements for being included in the pool of autonomous vehicles available to fulfill demand.)

At step 370, the transportation management system may update the predictive model of supply and demand for the fleet of autonomous vehicles based on the performance of event predictions, current conditions, known future events, and/or data indicative of actual supply and demand. In particular embodiments, the transportation system may use machine learning to generate and update a predictive model of supply and demand for a fleet of autonomous vehicles. For example, a machine-learning model may be trained on a set of training data. Each training sample may include information about input conditions, such as current conditions (including, in particular embodiments, data received from sensors located within autonomous vehicles or notifications of current events that are likely to affect demand for autonomous vehicles, such as weather or traffic disruptions) and future events (including, in particular embodiments, known and predicted future events that are likely to affect demand), a prediction of near-term demand for autonomous vehicles (including a demand level and a predicted duration of the predicted demand level) based on those inputs, and an indication of whether the prediction was correct. The machine-learning model may be trained to take as input, e.g., current conditions and future events, and to output predictions of near-term demand for autonomous vehicles that are increasingly more likely to be correct.

Particular embodiments may repeat one or more steps of the method of FIG. 3, where appropriate. For example, the transportation management system may repeat steps 340 to 370 one or more times to further refine the predictive model of supply and demand for the fleet of autonomous vehicles. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for generating a prediction of demand for autonomous vehicles based on historic data, current conditions, and future events including the particular steps of the method of FIG. 3, this disclosure contemplates any suitable method for generating a prediction of demand for autonomous vehicles based on historic data, current conditions, and future events including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
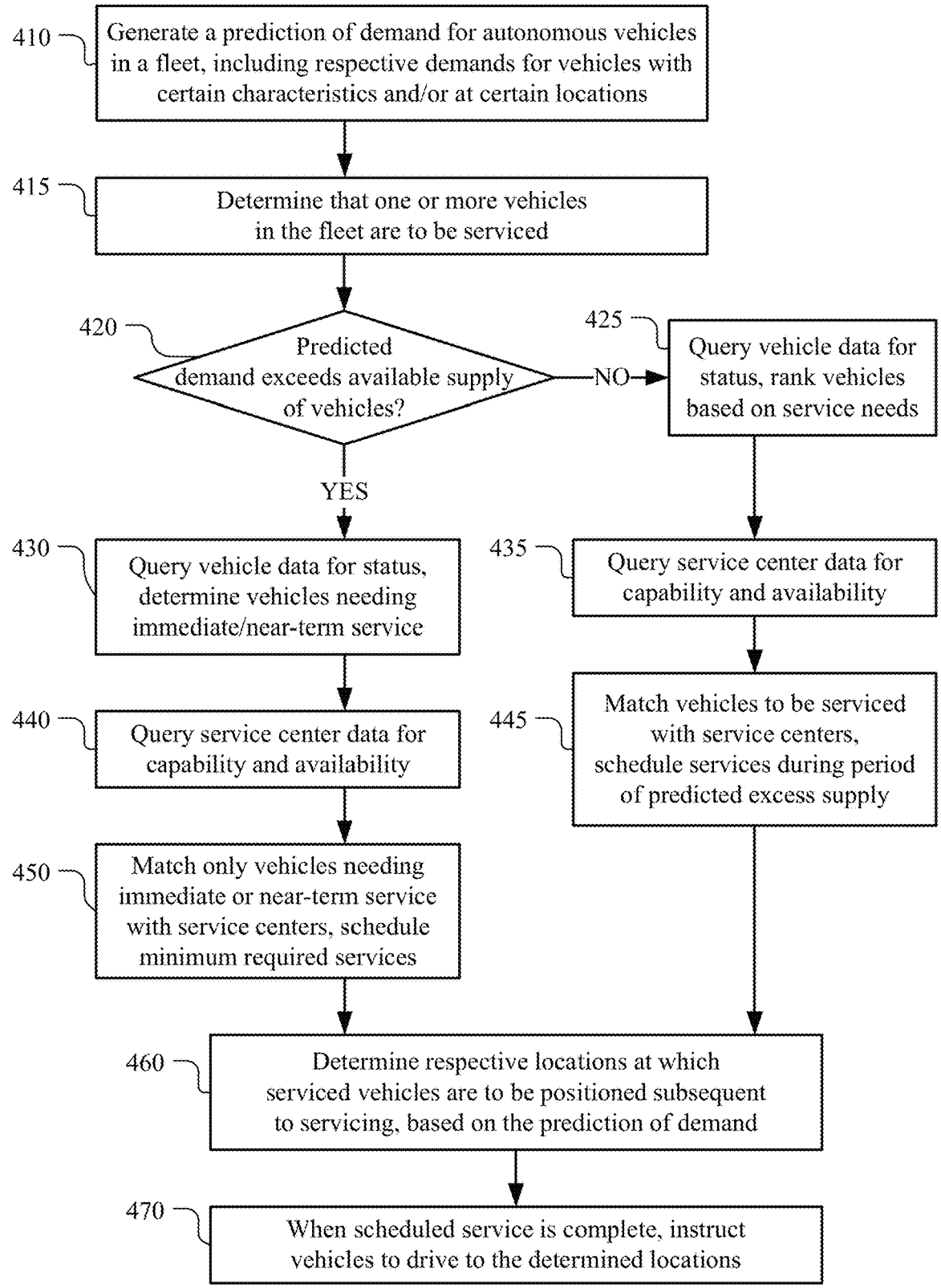
FIG. 4 illustrates an example of a method for managing maintenance for a fleet of autonomous vehicles using a prediction of demand.

FIG. 4 illustrates an example method 400 for managing maintenance for a fleet of autonomous vehicles using a prediction of demand, according to particular embodiments described herein. In particular embodiments, method 400 may be implemented by a transportation management system (such as system 110) or by a module or subsystem of a transportation management system. The method may begin at step 410, at which the transportation management system may generate a prediction of demand for autonomous vehicles in a fleet, including respective predictions of demands for vehicles with certain characteristics and/or at certain locations, according to particular embodiments described herein. For example, a prediction of demand for a luxury vehicle may be quite different from a prediction of demand for a vehicle having built-in child safety seats, and these predictions may vary at different locations within the operating region, at different times of day, and/or on different days. In particular embodiments, the prediction may be based on historical usage patterns, predicted or known future events that may affect supply and/or demand, and current conditions, as described in further detail herein.

At step 415, the transportation management system may determine that one or more vehicles in the fleet are to be serviced. For example, the transportation management system may be configured to determine which, if any, of the vehicles are due for periodic maintenance or inspection (e.g., based on a predetermined interval of mileage or time), whether their batteries need to be charged, whether they need to be washed or refueled, whether they need an oil change, or whether they are in need of repair.

At step 420, the transportation management system may determine whether the predicted demand exceeds the available supply of vehicles (e.g., vehicles that meet at least the minimum maintenance requirements for being placed in a pool of vehicles available to fulfill ride requests.) If, at step 420, it is determined that the predicted demand does not exceed the available supply of vehicles, the transportation management system may proceed to step 425. Otherwise, the transportation management system may proceed to step 430. At step 425, the transportation management system may query one or more autonomous vehicles for data representing their status, and may rank the vehicles based on their service needs. For example, the autonomous vehicles may be ranked according to the urgency with which they need servicing, the number of services they need, or other criteria. In particular embodiments, rather than querying the autonomous vehicles directly to obtain status information, the transportation management system may obtain status information for the autonomous vehicles from a location in memory at which it has been previously stored by the autonomous vehicles or by another component in a fleet maintenance management environment.

At step 435, the transportation management system may query one or more service centers to obtain data reflecting the capability and availability of the service centers to perform particular services. For example, in particular embodiments, the transportation management system may obtain, from each of multiple service centers, location information, indications of the capability of the service center to perform particular services, indications of the capacity of the service center to perform particular services at particular times, estimates of the amount of time required to perform various services, and/or estimated travel times from current locations of various autonomous vehicles to the service center.

At step 445, the transportation management system may match autonomous vehicles to be serviced with service centers having the required capabilities and capacity, based on the information received from the autonomous vehicles and the service centers, and may schedule services during a period of predicted excess supply, after which the transportation management system may proceed to step 460.

At step 430, the transportation management system may query one or more autonomous vehicles for data representing their status, and may determine which, if any, vehicles are in need of immediate or near-term service. In particular embodiments, rather than querying the autonomous vehicles directly to obtain status information, the transportation management system may obtain status information for the autonomous vehicles from a location in memory at which it has been previously stored by the autonomous vehicles or by another component in a fleet maintenance management environment. At step 440, the transportation management system may query one or more service centers, as described above, to obtain data reflecting the capability and availability of the service centers to perform particular services.

At step 450, the transportation management system may match only those autonomous vehicles needing immediate or near-term service with respective service centers having the required capabilities and capacity, and may schedule only the minimum required services, after which the transportation management system may proceed to step 460. In particular embodiments, the transportation management system may match the autonomous vehicles with urgent needs to respective service centers, and may schedule them to receive only those services that are sufficient to allow the autonomous vehicles to return to the pool of autonomous vehicles available to fulfill demand through the duration of a current period of excess demand. In one example, if a given autonomous vehicle needs to have its battery charged, but demand greatly exceeds supply, the transportation management system may match the autonomous vehicle to a service center and may schedule it to receive only a partial change (e.g., a charge sufficient to power the vehicle through the remaining portion of the period of high demand), rather than scheduling the vehicle to fully charge it battery. In another example, if a given autonomous vehicle needs fuel and is also due for an oil change, but demand greatly exceeds supply, the transportation management system may match the autonomous vehicle to a service center and may schedule it for fueling, but not for an oil change. In this example, once demand drops, the transportation management system may match the autonomous vehicle to a service center and may schedule it to receive an oil change.

In particular embodiments, the transportation system may use machine learning to improve the scheduling of autonomous vehicles for servicing based on a prediction of demand. For example, the transportation system may use machine learning techniques to optimize the scheduling based on collected maintenance information and relationships between the collected maintenance information and various demand predictions. In particular embodiments, the training data used for the machine learning may include monitored maintenance information received from the autonomous vehicles in the fleet during different demand periods, the amount of time taken to perform particular types of maintenance activities during different demand periods, the availability of autonomous vehicles to fulfill ride requests during different demand periods, the throughput of different service centers during different demand periods and/or other measures of maintenance activities considered in relation to different observed demand periods or predicted demand periods.

At step 460, the transportation management system may determine respective locations at which autonomous vehicles are to be positioned subsequent to servicing, based on the prediction of demand. For example, the prediction of demand may include a respective predicted demand level for each of multiple locations within the region in which the fleet of autonomous vehicles operates, and the transportation management system may determine that, after a given autonomous vehicle is serviced, it should be directed or returned to a location or sub-region currently experiencing a suboptimal ratio between the number of available autonomous vehicles and the predicted number of ride requests.

At step 470, the transportation management system may, when scheduled services are complete, instruct the serviced autonomous vehicles to drive to the determined locations. In particular embodiments, the serviced vehicles may be prepositioned at the determined locations prior to being returned to the pool of autonomous vehicles available to fulfill demand.

Particular embodiments may repeat one or more steps of the method of FIG. 4, where appropriate. For example, any or all of steps 410 to 470 may be repeated one or more times, as appropriate, to manage maintenance for multiple autonomous vehicles in a fleet of autonomous vehicles. In particular embodiments, some or all of the steps illustrated in FIG. 4 may be performed periodically or continuously (e.g., with multiple steps being performed substantially in parallel) to manage maintenance for multiple autonomous vehicles in a fleet of autonomous vehicles. For example, in particular embodiments, autonomous vehicles and/or service centers may be queried periodically (e.g., at fixed times or intervals). In another example, data may be received from autonomous vehicles and/or service centers when it is updated at the autonomous vehicles or service center and may be pushed to the transportation management system. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for managing maintenance for a fleet of autonomous vehicles using a prediction of demand including the particular steps of the method of FIG. 4, this disclosure contemplates any suitable method for managing maintenance for a fleet of autonomous vehicles using a prediction of demand including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
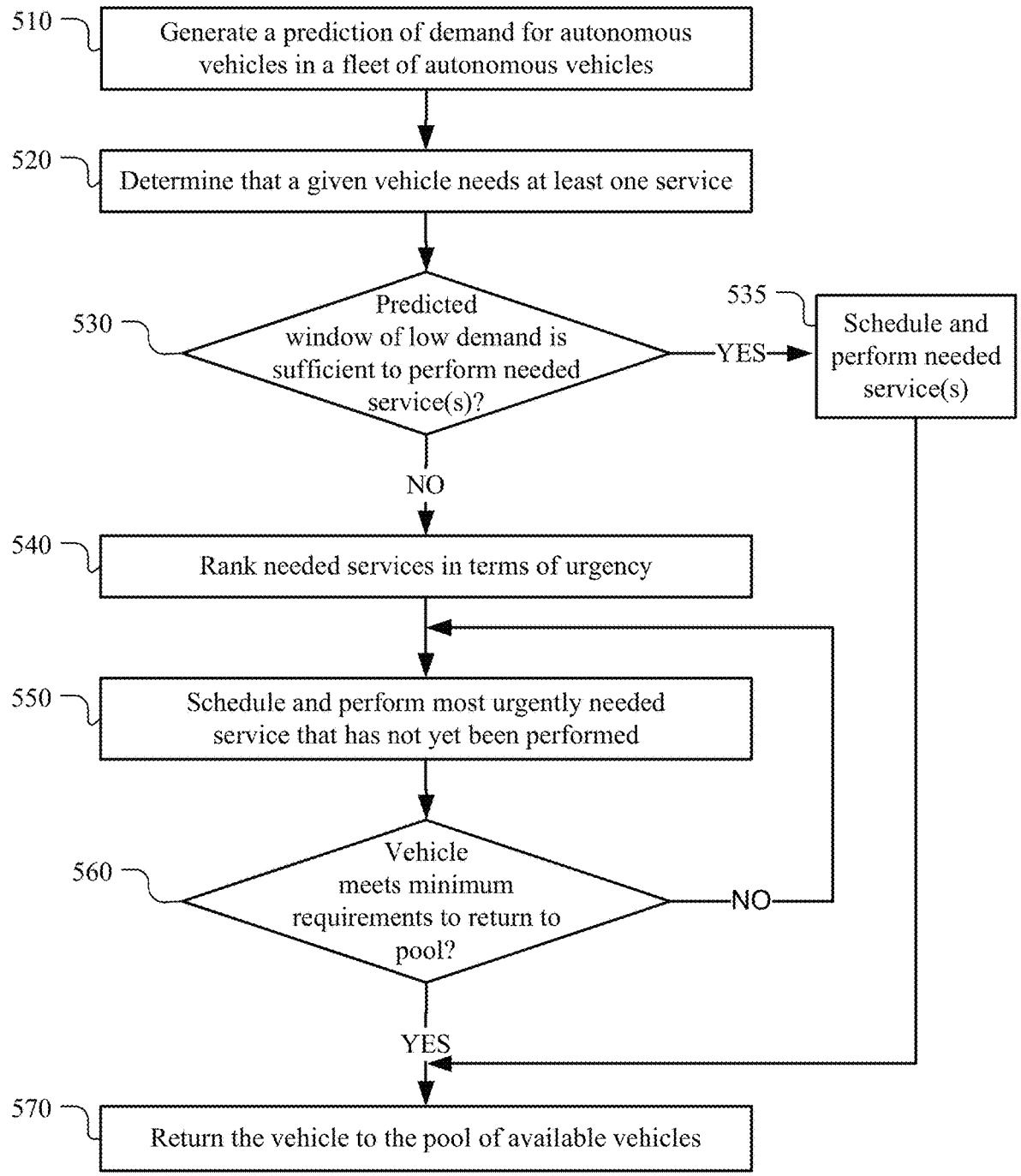
FIG. 5 illustrates an example of a method for scheduling an autonomous vehicle for one or more services based on a prediction of demand for autonomous vehicles in a fleet.

FIG. 5 illustrates an example method 500 for scheduling an autonomous vehicle for one or more services based on a prediction of demand for autonomous vehicles in a fleet, according to particular embodiments described herein. In particular embodiments, method 500 may be implemented by a transportation management system (such as system 110) or by a module or subsystem of a transportation management system. The method may begin at step 510, at which the transportation management system may generate a prediction of demand for autonomous vehicles in a fleet of autonomous vehicles, according to particular embodiments described herein.

At step 520, the transportation management system may determine that a given autonomous vehicle is in need of at least one service. In particular embodiments, determining that a given autonomous vehicle is in need of at least one service may include the transportation management system determining that multiple autonomous vehicles are in need of service, as described herein, and ranking the autonomous vehicles according to the urgency of their respective service needs. For example, conditions that may be considered urgent include a broken sensor, a low fuel level, or a battery with a low state of charge, while conditions that are not considered urgent may include a wear-and-tear condition, a need for a vehicle to be washed, or the expiration of a service internal based on a last service date or mileage. In particular embodiments, a subset of needed services may be performed during a short window of predicted low demand. In particular embodiments, a subset of needed services may be performed during a period of high or peak demand if, for example, a vehicle does not meet minimum maintenance requirements for being included in a pool of vehicles available to fulfill ride requests.

At step 530, the transportation management system may determine whether a predicted window of low demand is sufficiently long enough for the performance of all of the needed services. In one example, the transportation management system may receive data from one or more service centers indicating an estimated amount of time that it would take to perform each of the needed services at the service center, and may compare the total amount of time estimated to perform all of the needed services to a remaining portion of a predicted period of low demand. In another example, the transportation management system may access historic data indicating a minimum, maximum, median, or average length of time that a particular service center has taken to perform each of the needed services and may compare the sum to a remaining portion of a predicted period of low demand. If, at step 530, it is determined that the predicted window of low demand is sufficiently long enough for the performance of all of the needed services, the transportation management system may proceed to step 535. Otherwise, the transportation management system may proceed to step 540.

At step 535, the transportation management system may schedule the given autonomous vehicle to receive all of the needed services at one of the service centers, according to particular embodiments described herein. Once all of the needed services have been performed, the transportation management system may proceed to step 570.

At step 540, the transportation management system may rank the services needed by the given autonomous vehicle in terms of urgency, as described above. At step 550, the transportation management system may schedule the given autonomous vehicle to receive the most urgently needed service that has not yet been performed at one of the service centers, according to particular embodiments described herein, and the most urgently needed service may be performed.

At step 560, the transportation management system may determine whether, following performance of the most urgently needed service, the vehicle meets the minimum maintenance requirements to be returned to the pool of autonomous vehicles available to fulfill ride requests. If, at step 560, it is determined that the vehicle meets the minimum maintenance requirements to be returned to the pool of autonomous vehicles available to fulfill ride requests, the transportation management system may proceed to step 570. Otherwise, the transportation management system may return to step 550 to schedule and perform the next most urgently needed service that has not yet been performed.

At step 570, the transportation management system may return the vehicle, which now meets the minimum maintenance requirements, to the pool of autonomous vehicles available to fulfill ride requests, after which it may be matched with one or more ride requests.

Particular embodiments may repeat one or more steps of the method of FIG. 5, where appropriate. For example, the transportation management system may repeat steps 550-560 one or more times until the vehicle meets the minimum maintenance requirements to be returned to the pool of autonomous vehicles available to fulfill ride requests or until demand drops below supply, at which point all remaining needed services, regardless of their urgency, may be scheduled and performed. Although this disclosure describes and illustrates particular steps of the method of FIG. 5 as occurring in a particular order, this disclosure contemplates any suitable steps of the method of FIG. 5 occurring in any suitable order. For example, in particular embodiments, the transportation management system may, at step 550, schedule and perform multiple ones of the most urgently needed services substantially in parallel rather than sequentially. Moreover, although this disclosure describes and illustrates an example method for scheduling an autonomous vehicle for one or more services based on a prediction of demand including the particular steps of the method of FIG. 5, this disclosure contemplates any suitable method for scheduling an autonomous vehicle for one or more services based on a prediction of demand including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
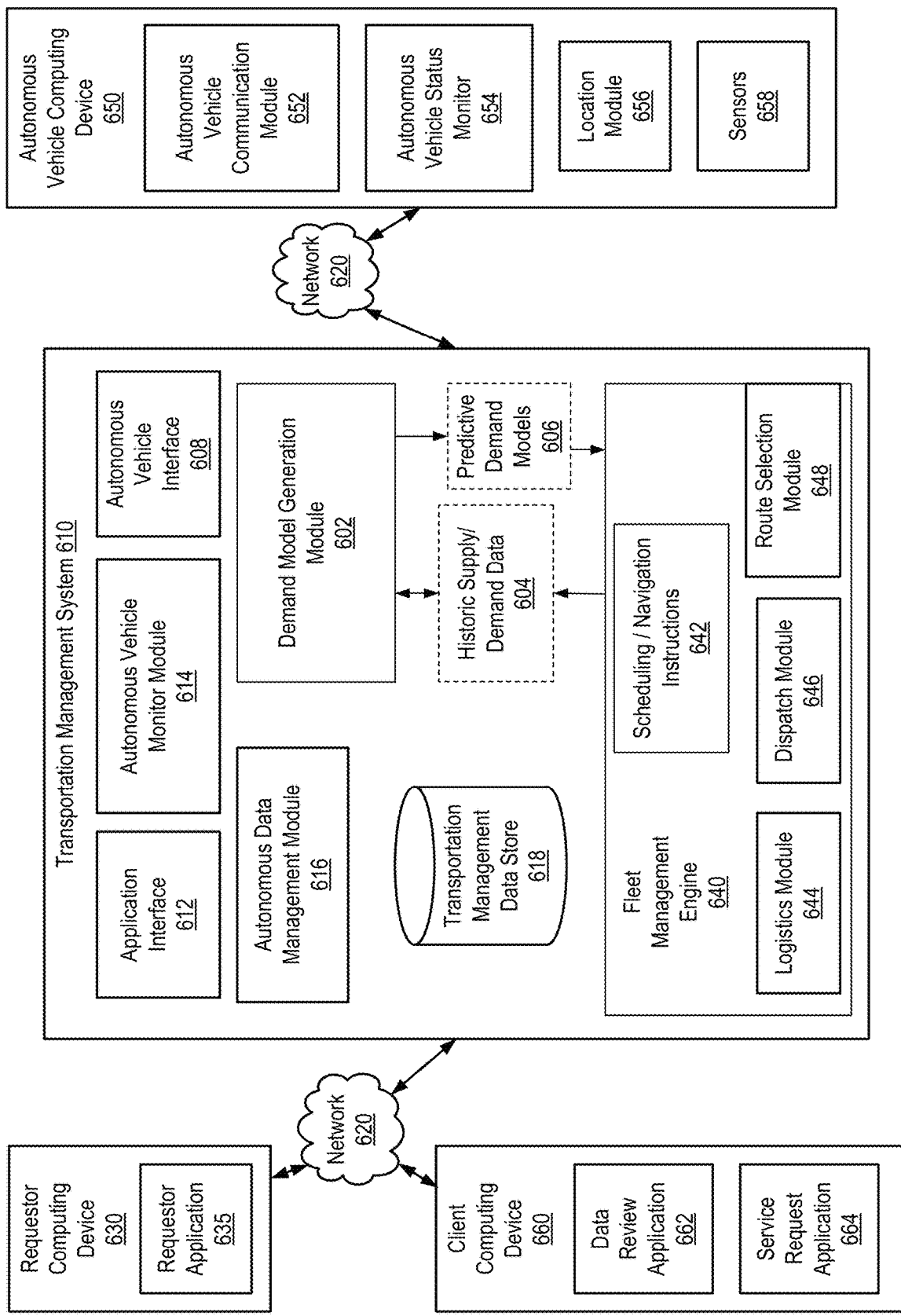
FIG. 6 illustrates examples of various systems in a transportation management environment, according to one or more embodiments.

Turning now to FIG. 6, examples of various systems in a transportation management environment are illustrated, according to one or more embodiments. As described above, transportation management system 610 may maximize availability of autonomous vehicles to ride requestors by generating predictive demand models and using those models when scheduling autonomous vehicles for services. For example, transportation management system 610 may be configured to implement any or all of the methods illustrated in FIGS. 2 through 5 and described above. As shown in FIG. 6, transportation management system 610 may include an application interface 612, an autonomous vehicle interface 608, an autonomous vehicle monitor module 614, an autonomous data management module 616, a demand model generation module 602, and a fleet management engine 640. In particular embodiments, fleet management engine 640 may include a dispatch module 646, a route selection module 648, a logistics module 644, and scheduling/navigation instructions 642.

In particular embodiments, transportation management system 610 may include one or more data stores. In one example, a data store may include one or more databases. In another example, a database may include one or more data stores. As illustrated, transportation management system 610 includes transportation management data store 618, which may include traffic pattern data, road condition data, autonomous route data, service center data, historic supply and demand data 604, and/or predictive demand models 606. In particular embodiments, information stored by transportation management data store 618 may be utilized by any of modules 602, 614, 616, 644, 646, or 648 in performing one or more corresponding functionalities. Although shown as a single transportation management data store 618, in particular embodiments, traffic pattern data, road condition data, autonomous route data, service center data, historic supply and demand data 604, predictive demand models 606, along with raw sensor data, location data, and/or any other type of data gathered by transportation management system 610, may be stored and/or maintained by two or more data stores, each of which stores and/or maintains data of one or more respective data types. Although transportation management system 610 is illustrated in a single element, transportation management system 610 may be hosted and/or implemented by multiple computer systems and/or distributed across multiple computer systems, according to particular embodiments. In one example, two or more of modules 602, 614, 616, 644, 646, or 648 may be performed and/or implemented by two or more computer systems. In another example, two or more of modules 602, 614, 616, 644, 646, or 648 may be separated into two or more services and/or over two or more computer systems to perform functionalities described herein.

In particular embodiments, transportation management system 610 may communicate with one or more requestor computing devices 630, one or more client computing devices 660, one or more autonomous vehicle computing devices 650, and/or one or more other computing devices. As illustrated, transportation management system 610 may communicate with one or more requestor computing devices 630, one or more client computing devices 660, and one or more autonomous vehicle computing devices 650 by network 620. In particular embodiments, network 620 may include one or more of a wireless network, a wired network, and an optical network, among others. For example, network 620 may include one or more of a wide area network (WAN), a private WAN, a local area network (LAN), a wireless LAN (WLAN), a public switched telephone network (PSTN), a metropolitan area network (MAN), a public WAN (e.g., an Internet), a satellite telephone network, a cellular telephone network, and a virtual private network (VPN), among others. In particular embodiments, network 620 may be coupled to one or more other networks. For example, network 620 may be coupled to one or more of a WAN, a WLAN, a PSTN, LAN, a MAN, a public WAN, a private WAN, a cellular telephone network, a satellite telephone network, and a VPN, among others.

In particular embodiments, application interface 612 may include any software and/or hardware configured to send and receive communications and/or other information between transportation management system 610 and requestor computing devices 630 and/or client computing device 660. For example, application interface 612 may be configured to facilitate communication between transportation management system 610 and a requestor application 635 operating on a requestor computing device 630 and/or a data review application 662 operating on a client computing device 660, among others. For instance, application interface 612 may receive ride requests, location information, a request location (also referred to as a "pick-up"

location), a drop-off location, a ride type, autonomous vehicle operating instructions, autonomous ride information, and/or any other relevant information from requestor computing device 630 executing requestor application 635.

In particular embodiments, a ride request may include a requestor identifier, location information (e.g., an address, latitude and longitude coordinates, etc.) for requestor computing device 630, a pick-up location for the ride request, one or more drop-off locations, a pick-up time, and/or any other suitable information associated with providing a transportation service to a ride requestor. In particular embodiments, requestor computing device 630 may be, represent, or include a personal computing device of a user (e.g., a ride requestor). For example, requestor computing device 630 may utilized to request a ride service from transportation management system 610. In particular embodiments, a ride request may be sent in a single message or may include a series of messages. For example, application interface 612 may receive the ride request and provide ride match messages, autonomous vehicle location information, travel routes, pick-up estimates, traffic information, requests for autonomous ride instructions, autonomous vehicle status information, updates/notifications, and/or any other relevant information to requestor application 635. For instance, requestor application 635 may receive the messages from application interface 612 and provide one or more of visual, audio, and haptic output based at least on the messages from application interface 612.

In particular embodiments, requestor application 635 may be configured to display, to the ride requestor, one or more available routes between the requestor's pickup location and drop-off location. The requestor may select one of the one or more available routes, causing a message indicating the selected route to be sent to transportation management system 610. In particular embodiments, client computing device 660 may represented any computing device operable to access data maintained by transportation management system 610 and collected by autonomous vehicle computing device 650. In particular embodiments, based at least on the selected route, dispatch module 646 may dispatch an autonomous vehicle to the pickup location with an instruction to follow the selected route. Route selection module 648 may then update autonomous route data stored in transportation management data store 618 to indicate when the route was last travelled by an autonomous vehicle.

In particular embodiments, autonomous vehicle computing device 650 may be or include a computing device integrated with an autonomous vehicle (e.g., an autonomous vehicle in a fleet of autonomous vehicles), such as an in-vehicle computing device configured to control the autonomous vehicle. In particular embodiments, autonomous vehicle computing device 650 may be a separate communications device configured to facilitate communication between transportation management system 610 and the autonomous vehicle.

In particular embodiments, autonomous vehicle interface 608 may include any software and/or hardware configured to send and receive communications and/or other information between transportation management system 610 and autonomous vehicle computing devices 650. In one example, autonomous vehicle interface 608 may be configured to receive location information, vehicle and/or ride status information, autonomous vehicle status, and/or any other relevant information from autonomous vehicle computing device 650. In another example, autonomous vehicle interface 608 may be configured to send ride requests, requestor location information, pick-up locations, travel routes, pick-up estimates, traffic information, provider updates/notifications, autonomous vehicle operating instructions, autonomous vehicle data, autonomous vehicle sensor data, and/or any other relevant information to the autonomous vehicle computing device 650. In particular embodiments, autonomous vehicle computing device 650 can be an in-vehicle computing device, such as any computing device that is configured to communicate with transportation management system 610 and/or requestor computing device 630 over one or more communication networks. For example, autonomous vehicle computing device 650 may include an autonomous vehicle communication module 652 that is configured to manage communications with transportation management system 610 and/or other autonomous vehicle computing devices. In particular embodiments, autonomous vehicle communication module 652 may provide vehicle, location, and travel data to transportation management system 610. In particular embodiments, autonomous vehicle computing device 650 may communicate directly with other nearby autonomous vehicle computing devices to share location data and/or travel data.

In particular embodiments, travel data may be collected by autonomous vehicle status monitor 654. For example, autonomous vehicle status monitor 654 may record information associated with utilization of an autonomous vehicle. For instance, vehicle status monitor 654 may record one or more of a number of rides completed by the autonomous vehicle, a number of miles traveled, a time elapsed, and other travel information since the autonomous vehicle last received maintenance. In particular embodiments, vehicle maintenance codes, such as codes associated with a check engine light, oil pressure, oil level, fuel level, etc. may also be recorded by autonomous vehicle status monitor 654. For example, autonomous vehicle information may be collected from the autonomous vehicle itself (e.g., by a controller area network bus) or from application programming interfaces provided by a vehicle manufacturer, which may send data directly to an in-car console and/or to transportation management system 610.

In particular embodiments, location module 656 may implement a global positioning system (GPS) receiver device, cellular communications triangulation, and/or any other suitable location-based techniques to determine coordinates or locations of device autonomous vehicle computing device 650. In particular embodiments, autonomous vehicle computing device 650 may request service work based on data recorded by vehicle status monitor 654. For example, a request for service work may be sent to transportation management system 610, and transportation management system 610 may determine a service center to provide service work for the autonomous vehicle.

In particular embodiments, a service center may include a client computing device 660, which may include a service request application 664. For example, service request application 664 may notify transportation management system 610 of its availability to perform certain services, the types of services it is capable of performing, and/or the average time it takes to perform certain services. For example, a service center may be specialized to perform various service types (e.g., autonomous vehicle maintenance, general vehicle maintenance, body repair, battery charging, wet cleaning, dry cleaning, etc.). Transportation management system 610 may then match an autonomous vehicle needing service to a service center.

In particular embodiments, service center data may be maintained in transportation management data store 618. When a service center is matched to an autonomous vehicle, information relevant to that service center may be retrieved and/or accessed from the service center data stored in transportation management data store 618. For example, if an autonomous vehicle is matched to a given service center, location information for the given service center (e.g., an address, a latitude and a longitude, etc.), a size of the given service center, and/or availability data for the given service center may be retrieved from transportation management data store 618. Similarly, service center data may be obtained for a battery charging, cleaning, and/or a maintenance facility, along with information about its size, location, services provided, etc.

In particular embodiments, sensors 658 may include one or more sensors, or sensor arrays, used to identify objects around an autonomous vehicle, as well as a roadway, a lane, a direction, a location, and other objects and roadway conditions the autonomous vehicle may encounter. In one example, sensors 658 may include electromagnetic sensors, including RADAR, LiDAR, infrared, ultraviolet, optical, and other sensors, acoustic sensors, position sensors, and other sensors. In a second example, sensors 658 may include multi-axis accelerometers and/or gyroscopes, weight scales, moisture sensors, in-vehicle cameras, and/or other sensors configured to monitor the interior status, contents, and/or motion of the autonomous vehicle. For instance, accelerometers may measure motion of the autonomous vehicle's cabin as the autonomous vehicle travels on different roads or different parts of a single road. In another example, sensors 658 may include various sensors described herein.

In particular embodiments, scales may be used to monitor seats, floors, and/or other user-accessible areas of the autonomous vehicle's cabin and/or may detect whether the weight of the cabin has changed, which may indicate a potential lost item left behind by a passenger or a potential spill. At least some of the sensor data may be stored as traffic pattern data and/or road condition data in transportation management data store 618. In particular embodiments, the sensor data may be provided to and analyzed by client computing device 660.

In particular embodiments, dispatch module 646 may include a software module that may be configured to process ride requests, ride responses, and/or other communications between ride requestors and providers of transportation management system 610 to match a requestor and a provider for a requested transportation service. For example, a ride request may be received from requestor computing device 630 and may include a pickup location and one or more destination and/or drop-off locations. In particular embodiments, dispatch module 646 may be configured to determine a dispatch type for a ride request based at least on one or more criteria associated with a route and/or a ride requestor. For example, the ride request may be originating in an area not served by autonomous vehicles, or the ride requestor's account may be associated with preference data indicating that human-driven vehicles should be preferentially dispatched whenever possible. For instance, dispatch module 646 may send an instruction to an autonomous vehicle computing device 650 associated with an autonomous vehicle to go to a pickup location based at least on the one or more criteria associated with the route and/or the ride requestor.

In particular embodiments, a particular route may be determined by route selection module 648. For example, route selection module 648 may identify one or more autonomous vehicle routes from autonomous route data stored in transportation management data store 618 to use based at least on current traffic, weather, and/or other roadway conditions. Additionally, or alternatively, route selection module 648 may be configured to select a default route for an autonomous vehicle based at least on how recently data was collected for that route.

In particular embodiments, one or more autonomous vehicle routes may be defined in transportation management data store 618. For example, these autonomous routes may be defined from designated pickup and drop-off locations in a geographic area. If the pickup and drop-off locations received in the ride request are each within one or more threshold distances of the designated pickup and drop-off locations, the autonomous vehicle ride type may be presented as an option to the ride requestor. Additionally, or alternatively, autonomous vehicle regions may be defined in transportation management data store 618 for a geographic region. For example, each autonomous region may be associated with mapping, driving, and/or roadway conditions that allow autonomous vehicles to navigate between locations within the region.

In particular embodiments, autonomous vehicle monitor module 614 may request vehicle status information from each autonomous vehicle computing device 650. When an autonomous vehicle has completed a ride, autonomous vehicle monitor 650 may determine if the autonomous vehicle may be made available for additional rides or if the autonomous vehicle needs service work. For example, autonomous vehicle monitor module 614 can maintain status thresholds and/or status rules. In particular embodiments, one or more status thresholds may be defined for various metrics collected by vehicle status monitor 654. For example, the one or more status thresholds may include one or more of a driving time, a number of rides, and a number of miles, among others.

In particular embodiments, the autonomous vehicle status information received from vehicle status monitor 654 may be compared to the one or more thresholds. If one or more metrics have exceeded a threshold, the autonomous vehicle may be routed to a service center. Additionally, or alternatively, status rules may be defined for vehicle maintenance codes, such as check engine codes, tire pressure codes, and oil level codes, among others. If a maintenance code is sent from the vehicle status monitor 654, it may be compared to the status rules and, if the maintenance code satisfies one or more of the rules, the autonomous vehicle may be routed to a service center. For example, each maintenance code may be associated with a different value indicating if service work needs to be performed immediately or if the service work may be deferred (e.g., "high," "medium," or "low," a numerical 1-10, or other value(s)).

In particular embodiments, autonomous vehicle monitor module 614 may determine service work needs across the current fleet of autonomous vehicles and may determine if one or more autonomous vehicles need to be routed for service work. For example, if the number of autonomous vehicles that are currently undergoing service work is high, and a maintenance code is associated with a "low" value, the service work may be deferred until service work has been completed on other autonomous vehicles. In particular embodiments, autonomous vehicle status monitor 654 may be configured to request cleaning services based on data collected by sensors 658. For example, if sensors 658 detect vehicle conditions indicating a cleaning issue, such as a spill, vehicle status monitor 654 may send a request to transportation management system 610 indicating that the autonomous vehicle requires cleaning. For example, the request may include a cleaning type, such as wet cleaning or dry cleaning. Logistics module 644 may determine a service center that provides an appropriate cleaning service, and dispatch module 646 may dispatch the autonomous vehicle to the determined service center.

In particular embodiments, autonomous data management module 616 may request sensor and/or location data from each autonomous vehicle computing device 650 of each autonomous vehicle in a fleet of autonomous vehicles. Autonomous data management module 616 may correlate vehicle location and/or speed of each corresponding computing device 650 and/or may store the data as traffic pattern in transportation management data store 618. In particular embodiments, accelerometer data may be correlated and/or associated with location data and/or may be stored as road condition data in transportation management data store 618. In particular embodiments, one or more data review applications 662 may access traffic pattern data and/or road condition data in transportation management data store 618. For example, traffic pattern data and/or road condition data may be mapped and/or visualized over one or more periods of time. As more data is received from autonomous vehicle computing devices 650 over time, traffic pattern data and/or road condition data may vary, as patterns and/or conditions change. In particular embodiments, recently collected data may be weighted relative to older collected data, which may cause recently detected changes to patterns and/or conditions to more quickly replace the patterns and conditions determined based at least on older data.

Demand model generation module 602 may be configured to access historic supply and demand data 604, data received from one or more service centers through application interface 612, data received from one or more autonomous vehicles through autonomous vehicle interface 608, and generate a prediction of demand for autonomous vehicles in a fleet of autonomous vehicles based on these inputs. As noted above, data received from service centers may include data representing service center status, capabilities, estimated times for performing particular services, and available capacity, and data received from autonomous vehicles may include vehicle status information, such as mileage or a time interval since the vehicle was last serviced, or data indicating that the vehicle is in need of fuel, a battery charge, an oil change, a car wash, or a repair to fix or replace a broken sensor or address a wear-and-tear condition. In particular embodiments, at least some of historic supply and demand data 604 may be specific to a region in which a fleet of autonomous vehicles operates or to particular locations within the region in which the fleet of autonomous vehicles operates, or may be specific to autonomous vehicles with particular characteristics.

Based on these inputs demand model generation module 602 may generate one or more new or updated predictive demand models 606, in accordance with particular embodiments described herein. Predictive demand models 606 may indicate times at which demand is predicted to be high, times at which demand is predicated to be low, and the predicted duration of these periods of high and low demand. In particular embodiments, predictive demand models 606 may indicate predictions of demand along a continuum of demand levels (including any number of high, medium and/or low demand levels) for particular periods of time in the future (e.g., for each thirty-minute or sixty-minute interval over the next 24-hour period, the next week, or the next month.) In particular embodiments, demand model generation module 602 may generate vehicle-specific predictive demand models 606 for autonomous vehicles having certain characteristics and/or may generate location-specific predictive demand models 606 for particular regions, sub-regions or specific locations within a region or sub-region. In particular embodiments, demand model generation module 602 may generate and update predictive demand models 606 using machine learning, as described herein. In particular embodiments, demand model generation module 602 may output a predicted demand level periodically or in response to a request for demand information by various modules of transportation management system 610 (e.g., logistics module 644). In particular embodiments, supply and demand data received by demand model generation module 602 may also be stored as additional data within historic supply and demand data 604, and may subsequently be used to generate new or updated predictive demand models 606.

Predictive demand models 606 may be provided to fleet management engine 640 of transportation management system 610. In particular embodiments, logistics module 644 of fleet management engine 640 may be configured to determine, based on predictive demand models 606, when particular autonomous vehicles should be scheduled for service and to generate corresponding scheduling and/or navigation instructions 642. In particular embodiments, historic supply and demand data, data received from service centers, data received from autonomous vehicles, or data received from a third party may include information about predicted or known future events that may affect supply and/or demand as well as information about current conditions that may affect supply and/or demand, and this information may be used in generating or updating predictive demand models 606 and/or in determining when particular autonomous vehicles should be scheduled for service.

Fleet management engine 640 may be configured to provide navigation instructions and/or other commands to autonomous vehicles in a fleet of autonomous vehicles in accordance with scheduling and/or navigation instructions 642. For example, navigation instructions and/or other commands may be communicated to particular autonomous vehicles by dispatch module 646. In particular embodiments, scheduling and/or navigation instructions 642 may include prepositioning instructions indicating locations to which autonomous vehicles in a fleet of autonomous vehicles should be directed following the completion of any scheduled services.

In particular embodiments, logistics module 644 may be configured to provide supply and/or demand data (such as ride request data or data indicating which or how many autonomous vehicles have been taken offline for servicing at one or more service centers) for storage as additional data within historic supply and demand data 604, which may subsequently be used to generate new or updated predictive demand models 606. In particular embodiments, logistics module 644 may be configured to determine, based on predictive demand models 606 and/or other factors, that one or more autonomous vehicles in a fleet of autonomous vehicles should be taken out of the pool of autonomous vehicles available to fulfill ride requests and stored. For example, if demand for autonomous vehicles, or for autonomous vehicles having certain characteristics, is predicated to be low for a considerable period of time (e.g., multiple days, weeks, or months), logistics module 644 may be configured to select one or more autonomous vehicles to be placed in a storage facility until demand is predicted to increase. In response to this determination, logistics module 644 may provide navigation instructions and/or other commands to one or more autonomous vehicles in a fleet of autonomous vehicles to direct them to a storage facility. In particular embodiments, one or more service centers may include facilities for storing autonomous vehicles that have been taken out of the pool of autonomous vehicles available to fulfill ride requests.

In particular embodiments, a transportation management system (such as system 110 or 610) may include one or more servers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, a transportation management system may include one or more data stores. The data stores may be used to store various types of information, such as ride information, ride requestor information, historical information, third-party information, or any other suitable type of information. In particular embodiments, the information stored in the data stores may be organized according to specific data structures. In particular embodiments, each data store may be a relational, columnar, correlation, or other suitable database system. Although this disclosure describes or illustrates particular types of databases, this disclosure contemplates any suitable types of databases. Particular embodiments may provide interfaces that enable a user device (such as device 630) which may belong to a ride requestor, a transportation management system (such as system 110 or 610), an autonomous vehicle (such as any vehicle in fleet 130), or a third-party system to process, transform, manage, retrieve, modify, add, or delete the information stored in a data store.

Figure 7:
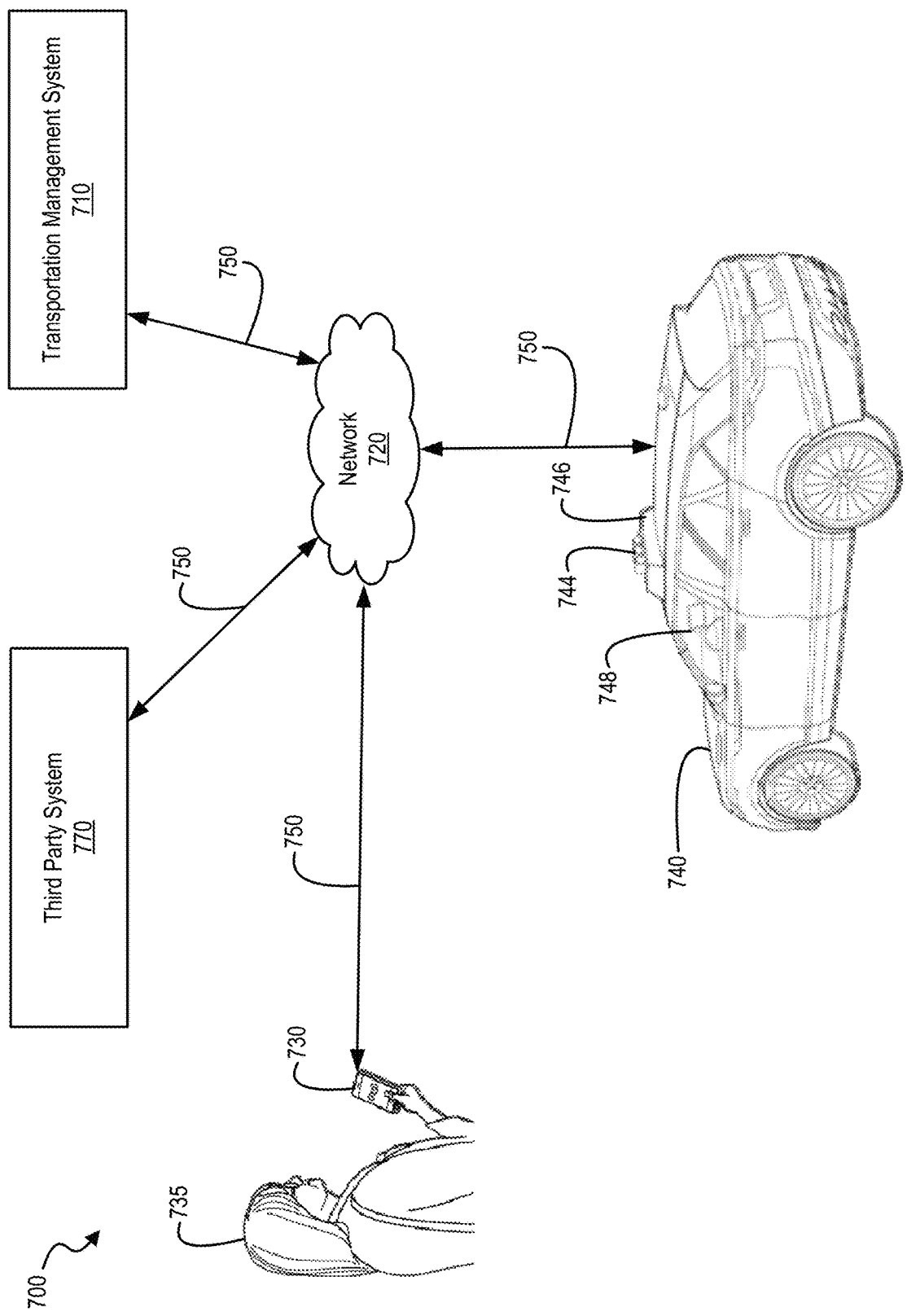
FIG. 7 illustrates an example of a transportation management environment, according to one or more embodiments.

FIG. 7 illustrates an example block diagram of a transportation management environment 700 for matching ride requestors with autonomous vehicles, according to one or more embodiments. In particular embodiments, the environment may include various computing entities, such as a user computing device 730 of a user 735 (e.g., a ride requestor), a transportation management system 710, an autonomous vehicle 740, and a third-party system 770. The computing entities may be communicatively connected over any suitable network 720. As an example and not by way of limitation, one or more portions of network 720 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 7 illustrates a single user device 730, a single transportation management system 710, a single vehicle 740, a single third-party system 770, and a single network 720, this disclosure contemplates any suitable number of each of these entities. As an example and not by way of limitation, the network environment may include multiple users 735, user devices 730, transportation management systems 710, autonomous-vehicles 740, third-party systems 770, and networks 720.

User device 730, transportation management system 710, autonomous vehicle 740, and third-party system 770 may be communicatively connected or co-located with each other in whole or in part. These computing entities may communicate via different transmission technologies and network types. For example, user device 730 and vehicle 740 may communicate with each other via a cable or short-range wireless communication (e.g., Bluetooth, NFC, WI-FI, etc.), and together they may be connected to the Internet via a cellular network accessible to either one of the devices (e.g., user device 730 may be a smartphone with LTE connection). Transportation management system 710 and third-party system 770, on the other hand, may be connected to the Internet via their respective LAN/WLAN networks and Internet Service Providers (ISP). FIG. 7 illustrates transmission links 750 that connect user device 730, autonomous vehicle 740, transportation management system 710, and third-party system 770 to communication network 720. This disclosure contemplates any suitable transmission links 750, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 750 may connect to one or more networks 720, which may include in part, e.g., ad hoc network, the Intranet, extranet, VPN, LAN, WLAN, WAN, WWAN, MAN, PSTN, a cellular network, a satellite network, or any combination thereof. The computing entities need not necessarily use the same type of transmission link 750. For example, user device 730 may communicate with transportation management system 710 via a cellular network and the Internet, but may communicate with autonomous vehicle 740 via Bluetooth or a physical wire connection.

In particular embodiments, transportation management system 710 may fulfill ride requests for one or more users 735 by dispatching suitable vehicles. Transportation management system 710 may receive any number of ride requests from any number of ride requestors 735. In particular embodiments, a ride request from a ride requestor 735 may include an identifier that identifies him/her in transportation management system 710. Transportation management system 710 may use the identifier to access and store the ride requestor's information, in accordance with his/her privacy settings. The ride requestor's information may be stored in one or more data stores (e.g., a relational database system) associated with and accessible to transportation management system 710. In particular embodiments, ride requestor information may include profile information about a particular ride requestor 735. In particular embodiments, a ride requestor 735 may be associated with one or more categories or types, through which the ride requestor 735 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, frequent destinations, historical riding patterns (e.g., time of day of travel, starting and ending locations, etc.), preferred language, age, gender, or any other suitable information. In particular embodiments, transportation management system 710 may classify a user 735 based on known information about the user (e.g., using machine-learning classifiers), and use the classification to retrieve relevant aggregate information associated with that class. For example, transportation management system 710 may classify a user 735 as a teenager and retrieve relevant aggregate information associated with teenagers, such as the type of music generally preferred by teenagers.

Transportation management system 710 may also store and access ride information. Ride information may include locations related to the ride, traffic data, route options, optimal pick-up or drop-off locations for the ride, or any other suitable information associated with a ride. As an example and not by way of limitation, when transportation management system 710 receives a request to travel from San Francisco International Airport (SFO) to Palo Alto, Calif., the system may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by transportation management system 710. For example, historical data may include aggregate information generated based on past ride information, which may include any ride information described herein and telemetry data collected by sensors in autonomous vehicles and/or user devices. Historical data may be associated with a particular user 735 (e.g., that particular user's preferences, common routes, etc.), a category/class of users (e.g., based on demographics), and/or all users 735 of transportation management system 710. For example, historical data specific to a particular user 735 may include information about past rides the particular user has taken, including the locations at which the user is picked up and dropped off, music the user likes to listen to, traffic information associated with the rides, time of the day the user most often rides, and any other suitable information specific to the user. As another example, historical data associated with a category/class of users 735 may include, e.g., common or popular ride preferences of users in that category/class, such as teenagers preferring pop music, ride requestors who frequently commute to the financial district may prefer to listen to news, etc. As yet another example, historical data associated with all users may include general usage trends, such as traffic and ride patterns. Using historical data, transportation management system 710 may, in particular embodiments, predict and provide ride suggestions (e.g., preferred or alternate routes) in response to a ride request. In particular embodiments, transportation management system 710 may use machine-learning techniques, such as neural-networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 710 may include an authorization server (or other suitable component(s)) that allows users 735 to opt-in to or opt-out of having their information and actions logged, recorded, or sensed by transportation management system 710 or shared with other systems (e.g., third-party system 770). In particular embodiments, a user 735 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 735 of transportation management system 710 through blocking, data hashing, anonymization, or other suitable techniques as appropriate.

In particular embodiments, third-party system 770 may be a network-addressable computing system that may host GPS maps, customer reviews, music or content, weather information, or any other suitable type of information. Third-party system 770 may generate, store, receive, and send relevant data, such as, for example, map data, customer review data from a customer review website, weather data, or any other suitable type of data. Third-party system 770 may be accessed by the other computing entities of the network environment either directly or via network 720. For example, user device 735 may access the third-party system 770 via network 720, or via transportation management system 710. In the latter case, if credentials are required to access the third-party system 770, the user 735 may provide such information to transportation management system 710, which may serve as a proxy for accessing content from the third-party system 770.

In particular embodiments, user device 730 may be a mobile computing device such as a smartphone, tablet computer, or laptop computer. User device 730 may include one or more processors (e.g., CPU and/or GPU), memory, and storage. An operating system and applications may be installed on the user device 730, such as, e.g., a transportation application associated with transportation management system 710, applications associated with third-party system 770, and applications associated with the operating system. User device 730 may include functionality for determining its location, direction, or orientation, based on integrated sensors such as GPS, compass, gyroscope, or accelerometer. User device 730 may also include wireless transceivers for wireless communication, and may support wireless communication protocols such as Bluetooth, near-field communication (NFC), infrared (IR) communication, WI-FI, and/or 2G/3G/4G/LTE mobile communication standard. User device 730 may also include one or more cameras, scanners, touchscreens, microphones, speakers, and any other suitable input-output devices.

In particular embodiments, autonomous vehicle 740 may be equipped with an array of sensors 744, a navigation system 746, and a computing device 748. In particular embodiments, a fleet of autonomous vehicles 740 may be managed by transportation management system 710. The fleet of autonomous vehicles 740 may, in whole or in part, be owned by the entity associated with transportation management system 710, or may be owned by a third-party entity relative to transportation management system 710. In either case, transportation management system 710 may control the operations of the autonomous vehicles 740 in the fleet, including, e.g., dispatching select vehicles 740 to fulfill ride requests, instructing select vehicles 740 to perform select operations (e.g., drive to a service center or charging/fueling station, pull over, stop immediately, self-diagnose, lock/unlock compartments, change music station, change temperature, and any other suitable operations), and/or instructing select vehicles 740 to enter select operation modes (e.g., operate normally, drive at a reduced speed, drive under the command of human operators, and any other suitable operational modes).

In particular embodiments, the autonomous vehicles 740 may receive data from and transmit data to transportation management system 710 and third-party system 770. Examples of received data may include, e.g., instructions, new software or software updates, maps, 3D models, trained or untrained machine-learning models, location information (e.g., the location of the ride requestor, the autonomous vehicle 740 itself, other autonomous vehicles 740, and/or target destinations such as service centers), navigation information, traffic information, weather information, entertainment content (e.g., music, video, and news) ride requestor information, ride information, and any other suitable information. Examples of data transmitted from the autonomous vehicle 740 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs and any other suitable data. In particular embodiments, passengers may send data to or receive data from transportation management system 710 and/or third-party system 770 through a user interface in autonomous vehicle 740.

In particular embodiments, autonomous vehicles 740 may also communicate with each other as well as with traditional human-driven vehicles, some of which may be managed by transportation management system 710. For example, autonomous vehicle 740 may communicate with another autonomous vehicle 740 regarding their respective locations, conditions, status, sensor readings, or any other suitable information. In particular embodiments, vehicle-to-vehicle communication may take place over direct short-range wireless connection (e.g., WI-FI, Bluetooth, NFC) and/or over a network (e.g., the Internet or via transportation management system 710 or third-party system 770).

In particular embodiments, an autonomous vehicle 740 may obtain and process sensor/telemetry data. Such data may be captured by any suitable sensors. For example, sensors 744 of vehicle 740 may include a Light Detection and Ranging (LiDAR) sensor array of multiple LiDAR transceivers that are configured to rotate 360°, emitting pulsed laser light and measuring the reflected light from objects surrounding vehicle 740. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of autonomous vehicle 740. As an example and not by way of limitation, the 3D model may represent the external environment including objects such as other cars, curbs, debris, objects, and pedestrians up to a maximum range of the sensor arrangement (e.g., 50, 100, or 200 meters). As another example, autonomous vehicle 740 may have optical cameras pointing in different directions. The cameras may be used for, e.g., recognizing roads, lane markings, street signs, traffic lights, police, other vehicles, and any other visible objects of interest. To enable autonomous vehicle 740 to "see" at night, infrared cameras may be installed. In particular embodiments, the vehicle may be equipped with stereo vision for, e.g., spotting hazards such as pedestrians or tree branches on the road. As another example, autonomous vehicle 740 may have radars for, e.g., detecting other vehicles and/or hazards afar. Furthermore, autonomous vehicle 740 may have ultra sound equipment for, e.g., parking and obstacle detection. In addition to sensors enabling autonomous vehicle 740 to detect, measure, and understand the external world around it, autonomous vehicle 740 may further be equipped with sensors for detecting and self-diagnosing the its own state and condition. For example, autonomous vehicle 740 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieving using any combination of sensors. For example, an autonomous vehicle 740 may build a 3D model of its surrounding based on data from its LiDAR, radar, sonar, and cameras, along with a pre-generated map obtained from transportation management system 710 or third-party system 770. Although sensors 744 appear in a particular location on autonomous vehicle 740 in FIG. 7, sensors 744 may be located in any suitable location in or on autonomous vehicle 740. Example locations for sensors include the front and rear bumpers, the doors, the front windshield, on the side paneling, or any other suitable location.

In particular embodiments, autonomous vehicle 740 may be equipped with a processing unit (e.g., one or more CPUs and GPUs), memory, and storage. Autonomous vehicle 740 may thus be equipped to perform a variety of computational and processing tasks, including processing the sensor data, extracting useful information, and operating accordingly. For example, based on images captured by its cameras and a machine-vision model, autonomous vehicle 740 may identify particular types of objects captured by the images, such as pedestrians, other vehicles, lanes, curbs, and any other objects of interest.

In particular embodiments, autonomous vehicle 740 may have a navigation system 746 responsible for safely navigating autonomous vehicle 740. In particular embodiments, navigation system 746 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. Navigation system 746 may also utilize, e.g., map data, traffic data, accident reports, road construction information, weather reports, instructions, target destinations, and any other suitable information to determine navigation routes and particular driving operations (e.g., slowing down, speeding up, stopping, swerving, etc.). In particular embodiments, navigation system 746 may use its determinations to control autonomous vehicle 740 to operate in prescribed manners and to guide autonomous vehicle 740 to its destinations without colliding into other objects. Although the physical embodiment of navigation system 746 (e.g., the processing unit) appears in a particular location on autonomous vehicle 740 in FIG. 7, navigation system 746 may be located in any suitable location in or on autonomous vehicle 740. Example locations for navigation system 746 include inside the cabin or passenger compartment of autonomous vehicle 740, near the engine/battery, near the front seats, rear seats, or in any other suitable location.

In particular embodiments, autonomous vehicle 740 may be equipped with a computing device 748, which may be a tablet or other suitable device installed by, or on behalf of, a transportation service to allow a user 735 to interact with autonomous vehicle 740, transportation management system 710, other users 735, or third-party system 770. In particular embodiments, installation of computing device 748 may be accomplished by placing computing device 748 inside autonomous vehicle 740, and configuring it to communicate with autonomous vehicle 740 via a wired or wireless connection (e.g., via Bluetooth). Although FIG. 7 illustrates a single computing device 748 at a particular location in autonomous vehicle 740, autonomous vehicle 740 may include several computing devices 748 in several different locations within the vehicle. As an example and not by way of limitation, autonomous vehicle 740 may include four computing devices 748 located in the following places: one in front of the front-left passenger seat (e.g., driver's seat in traditional U.S. automobiles), one in front of the front-right passenger seat, one in front of each of the rear-left and rear-right passenger seats. In particular embodiments, computing device 748 may be detachable from any component of autonomous vehicle 740. This may allow users to handle computing device 748 in a manner consistent with other tablet computing devices. As an example and not by way of limitation, a user may move computing device 748 to any location in the cabin or passenger compartment of autonomous vehicle 740, may hold computing device 748 in his/her lap, or handle computing device 748 in any other suitable manner. Although this disclosure describes providing a particular computing device in a particular manner, this disclosure contemplates providing any suitable computing device in any suitable manner.

Figure 8:
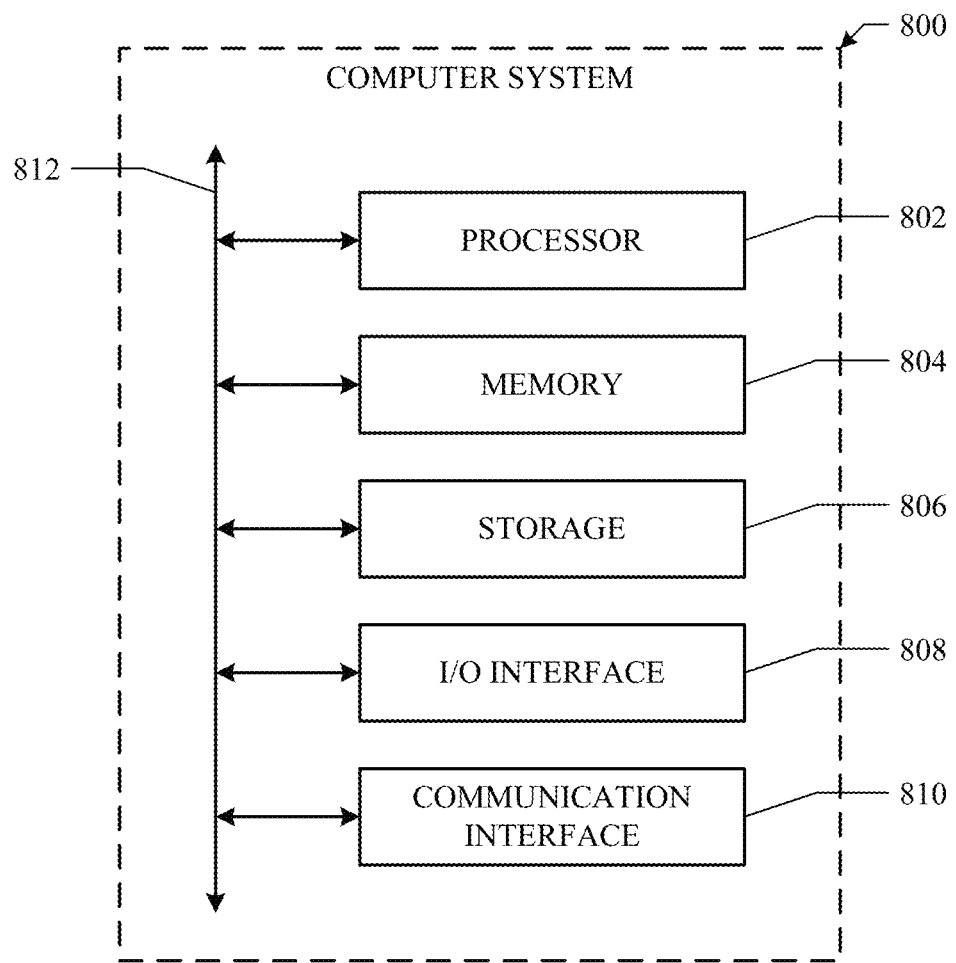
FIG. 8 illustrates an example of a computing system.

FIG. 8 illustrates an example computer system 800. In particular embodiments, one or more computer systems 800 may implement the functionality of any of a user device (such as device 730 or 630) which may belong to a ride requestor (such as a user 735), a transportation management system (such as system 710 or 610), an autonomous vehicle (such as vehicle 740 or any vehicle in fleet 230), or a third-party system (such as system 770). In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described in further detail below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   determining a predicted amount of ride requests for a plurality of collectively-managed vehicles;
   determining an availability of the collectively-managed vehicles to satisfy the predicted amount of ride requests;
   subsequent to determining that the availability of the collectively-managed vehicles fails to satisfy one or more predetermined criteria for servicing the predicted amount of ride requests, determining status information associated with the collectively-managed vehicles;
   determining, based on at least the status information associated with the collectively-managed vehicles, one or more minimum services for servicing one or more vehicles among the plurality of collectively-managed vehicles at one or more service centers such that the availability of the collectively-managed vehicles satisfies the one or more predetermined criteria for servicing the predicted amount of ride requests; and
   instructing the one or more vehicles that are to receive the one or more minimum services to travel to the one or more service centers to be serviced.

2. The method of claim 1, wherein determining the predicted amount of ride requests is based on one or more of:
   a future event comprising a known upcoming event likely to affect an amount of ride requests in a region in which the collectively-managed vehicles operate or a predicted upcoming event likely to affect the amount of ride requests in the region in which the collectively-managed vehicles operate;
   a current condition affecting traffic in the region in which the collectively-managed vehicles operate;
   historic data including a first amount of ride requests for vehicles in the region in which the collectively-managed vehicles operate and a second amount of vehicles available to fulfill the amount of ride requests in the region in which the collectively-managed vehicles operate; and
   a respective vehicle characteristic of one or more vehicles in the collectively-managed vehicles, the characteristic including at least one of a vehicle type, a vehicle class, or an optional vehicle feature.

3. The method of claim 1, wherein, prior to determining the status information, the availability of the collectively-managed vehicles fails to satisfy a number of vehicles required to satisfy the amount of predicted ride requests, and the one or more vehicles that are to receive the one or more minimum services causes the availability of the collectively-managed vehicles to satisfy the number.

4. The method of claim 1, further comprising:
   determining respective locations at which the one or more vehicles are to be positioned subsequent to receiving the one or more minimum services based on the predicted amount of ride requests; and
   instructing the one or more vehicles to travel to the determined locations.

5. The method of claim 1, further comprising determining, based on the status information, an urgency ranking for services needed by one or more vehicles in the collectively-managed vehicles, wherein determining the one or more minimum services is further based on the urgency ranking.

6. The method of claim 1, wherein the one or more predetermined criteria for servicing the predicted amount of ride requests is based on a condition of the plurality of collectively-managed vehicles.

7. The method of claim 1, further comprising:
   receiving respective status information from at least one service center, the status information comprising a capability and availability of the at least one service center to perform particular services;
   determining the one or more service centers based on the respective status information received from the at least one service center; and matching, based on the determined one or more minimum services, the one or more vehicles that are to receive the one or more minimum services with the respective one or more service centers.

8. The method of claim 1, further comprising:
subsequent to determining that the availability of the collectively-managed vehicles satisfies the one or more predetermined criteria for servicing the predicted amount of ride requests, determining status information associated with the collectively-managed vehicles;
determining, based on at least the status information associated with the collectively-managed vehicles, one or more vehicles in need of service among the plurality of collectively-managed vehicles;
ranking the one or more vehicles in need of service based on their service needs;
scheduling the one or more vehicles in need of service to receive service at one or more service centers during a period when the availability of the collectively-managed vehicles is expected to satisfy the predicted amount of ride requests; and
instructing the one or more vehicles that are to receive service to travel to the one or more service centers to be serviced.

9. The method of claim 1, wherein at least one of:
the one or more vehicles are autonomous vehicles, and the instructions are transmitted to a communications device associated with the autonomous vehicles; or
the one or more vehicles are human-driven vehicles, and the instructions are transmitted to a communications device associated with the human-driven vehicles.

10. A system comprising: one or more processors and one or more computer-readable non-transitory storage media coupled to one or more of the processors, the one or more computer-readable non-transitory storage media comprising instructions operable when executed by one or more of the processors to cause the system to perform operations comprising:
determining a predicted amount of ride requests for a plurality of collectively-managed vehicles;
determining an availability of the collectively-managed vehicles to satisfy the predicted amount of ride requests;
subsequent to determining that the availability of the collectively-managed vehicles fails to satisfy one or more predetermined criteria for servicing the predicted amount of ride requests, determining status information associated with the collectively-managed vehicles;
determining, based on at least the status information associated with the collectively-managed vehicles, one or more minimum services for servicing one or more vehicles among the plurality of collectively-managed vehicles at one or more service centers such that the availability of the collectively-managed vehicles satisfies the one or more predetermined criteria for servicing the predicted amount of ride requests; and
causing instructions to be communicated to the one or more vehicles that are to receive the one or more minimum services to travel to the one or more service centers to be serviced.

11. The system of claim 10, wherein determining the predicted amount of ride requests is based on one or more of:
a future event comprising a known upcoming event likely to affect an amount of ride requests in a region in which the collectively-managed vehicles operate or a predicted upcoming event likely to affect the amount of ride requests in the region in which the collectively-managed vehicles operate;
a current condition affecting traffic in the region in which the collectively-managed vehicles operate;
historic data including a first amount of ride requests for vehicles in the region in which the collectively-managed vehicles operate and a second amount of vehicles available to fulfill the amount of ride requests in the region in which the collectively-managed vehicles operate; and
a respective vehicle characteristic of one or more vehicles in the collectively-managed vehicles, the characteristic including at least one of a vehicle type, a vehicle class, or an optional vehicle feature.

12. The system of claim 10, wherein, prior to determining the status information, the availability of the collectively-managed vehicles fails to satisfy a number of vehicles required to satisfy the amount of predicted ride requests, and the one or more vehicles that are to receive the one or more minimum services causes the availability of the collectively-managed vehicles to satisfy the number.

13. The system of claim 10, wherein the processors are further operable when executing the instructions to perform operations comprising:
determining respective locations at which the one or more vehicles are to be positioned subsequent to receiving the one or more minimum services based on the predicted amount of ride requests; and
causing instructions to be communicated to the one or more vehicles to travel to the determined locations.

14. The system of claim 10, wherein the processors are further operable when executing the instructions to perform operations comprising:
determining, based on the status information, an urgency ranking for services needed by one or more vehicles in the collectively-managed vehicles, wherein determining the one or more minimum services is further based on the urgency ranking.

15. The system of claim 10, wherein the one or more predetermined criteria for servicing the predicted amount of ride requests is based on a condition of the plurality of collectively-managed vehicles.

16. The system of claim 10, wherein the processors are further operable when executing the instructions to perform operations comprising:
receiving respective status information from at least one service center, the status information comprising a capability and availability of the at least one service center to perform particular services;
determining the one or more service centers based on the respective status information received from the at least one service center; and
matching, based on the determined one or more minimum services, the one or more vehicles that are to receive the one or more minimum services with the respective one or more service centers.

17. The system of claim 10, wherein the processors are further operable when executing the instructions to perform operations comprising:
subsequent to determining that the availability of the collectively-managed vehicles satisfies the one or more predetermined criteria for servicing the predicted amount of ride requests, determining status information associated with the collectively-managed vehicles;
determining, based on at least the status information associated with the collectively-managed vehicles, one or more vehicles in need of service among the plurality of collectively-managed vehicles;

ranking the one or more vehicles in need of service based on their service needs;

scheduling the one or more vehicles in need of service to receive service at one or more service centers during a period when the availability of the collectively-managed vehicles is expected to satisfy the predicted amount of ride requests; and causing instructions to be communicated to the one or more vehicles that are to receive service to travel to the one or more service centers to be serviced.

18. The system of claim 10, wherein at least one of:

the one or more vehicles are autonomous vehicles, and the instructions are transmitted to a communications device associated with the autonomous vehicles; or the one or more vehicles are human-driven vehicles, and the instructions are transmitted to a communications device associated with the human-driven vehicles.

19. One or more computer-readable non-transitory storage media including instructions that are operable, when executed by one or more processors, to perform operations comprising:

determining a predicted amount of ride requests for a plurality of collectively-managed vehicles;

determining an availability of the collectively-managed vehicles to satisfy the predicted amount of ride requests;

subsequent to determining that the availability of the collectively-managed vehicles fails to satisfy one or more predetermined criteria for servicing the predicted amount of ride requests, determining status information associated with the collectively-managed vehicles;

determining, based on at least the status information associated with the collectively-managed vehicles, one or more minimum services for servicing one or more vehicles among the plurality of collectively-managed vehicles at one or more service centers such that the availability of the collectively-managed vehicles satisfies the one or more predetermined criteria for servicing the predicted amount of ride requests; and causing instructions to be communicated to the one or more vehicles that are to receive the one or more minimum services to travel to the one or more service centers to be serviced.

20. The one or more computer-readable non-transitory storage media of claim 19, wherein, prior to determining the status information, the availability of the collectively-managed vehicles fails to satisfy a number of vehicles required to satisfy the amount of predicted ride requests, and the one or more vehicles that are to receive the one or more minimum services causes the availability of the collectively-managed vehicles to satisfy the number.

* * * * *